(12) United States Patent  
Eidam et al.

(10) Patent No.: US 11,457,730 B1
(45) Date of Patent: Oct. 4, 2022

(54) TACTILE INPUT DEVICE FOR A TOUCH SCREEN

(71) Applicant: Wells Fargo Bank, N.A., San Francisco, CA (US)

(72) Inventors: Kourtney Eidam, Marietta, GA (US); Darren M. Goetz, Salinas, CA (US); Dennis E. Montenegro, Concord, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/088,320

(22) Filed: Nov. 3, 2020

Related U.S. Application Data

(63) Continuation-in-part of application No. 17/079,958, filed on Oct. 26, 2020, and a continuation-in-part of (Continued)

(51) Int. Cl.
*A47B 21/007* (2006.01)
*G06F 3/04886* (2022.01)
(Continued)

(52) U.S. Cl.
CPC .......... *A47B 21/007* (2013.01); *G06F 3/0221* (2013.01); *G06F 3/04886* (2013.01);
(Continued)

(58) Field of Classification Search
CPC ...... A47B 21/007; H04W 4/80; G06F 3/0221; G06F 3/04886
See application file for complete search history.

(56) References Cited

U.S. PATENT DOCUMENTS 6,430,542 B1    8/2002   Moran
6,493,469 B1   12/2002   Taylor et al.
(Continued)

FOREIGN PATENT DOCUMENTS

CN   107977776   5/2018
CN   108198076   6/2018
(Continued)

OTHER PUBLICATIONS

Cho et al.; Interaction for Tabletop Computing Environment an Analysis and Implementation 8 Pages.
(Continued)

*Primary Examiner* — Seth A Silverman
(74) *Attorney, Agent, or Firm* — Foley & Lardner LLP

(57) ABSTRACT

Systems, methods, and apparatuses for tactile user input are described herein. A tactile user input system includes a tactile input device and a smart table. The smart table comprises a network interface and a processing circuit. The processing circuit comprises a processor and a memory. The processing circuit is structured to sense a placement of the tactile input device on the smart table. The processing circuit is further structured to determine a necessary user input and determine a location of the tactile input device on the smart table. The processing circuit is further structured to rearrange a user interface of the smart table. The processing circuit is further structured to communicate a necessary input configuration to the tactile input device and used by the tactile input device to generate a tactile user interface having an appropriate layout based on the necessary input configuration.

19 Claims, 16 Drawing Sheets

Related U.S. Application Data application No. 17/079,961, filed on Oct. 26, 2020, and a continuation-in-part of application No. 17/079,971, filed on Oct. 26, 2020.

(51) Int. Cl.
  *G06F 3/02* (2006.01)
  *H04W 4/80* (2018.01)
  *G06Q 20/40* (2012.01)
  *G06Q 40/02* (2012.01)

(52) U.S. Cl.
  CPC ....... *H04W 4/80* (2018.02); *A47B 2021/0076* (2013.01); *G06Q 20/40145* (2013.01); *G06Q 40/02* (2013.01)

(56) References Cited

U.S. PATENT DOCUMENTS

| | | | |
|---|---|---|---|
| 6,667,738 | B2 | 12/2003 | Murphy |
| 6,866,388 | B2 | 3/2005 | Yang |
| 7,027,040 | B2 | 4/2006 | Rekimoto et al. |
| 7,403,191 | B2 | 7/2008 | Sinclair |
| 8,194,045 | B1 | 6/2012 | Maloney et al. |
| 8,195,576 | B1 | 6/2012 | Grigg et al. |
| 8,206,047 | B1 | 6/2012 | Isaac et al. |
| 8,207,872 | B2 | 6/2012 | Huang et al. |
| 8,346,672 | B1 | 1/2013 | Weiner et al. |
| 8,356,712 | B2 | 1/2013 | Piazza, Jr. |
| 8,438,110 | B2 | 5/2013 | Calman et al. |
| 8,451,248 | B1 | 5/2013 | Kim |
| 8,502,789 | B2 | 8/2013 | Tse et al. |
| 8,549,589 | B2 | 10/2013 | Stollman |
| 8,700,772 | B2 | 4/2014 | Saint Clair |
| 8,743,072 | B2 | 6/2014 | Kim |
| 8,854,330 | B1 | 10/2014 | Maloney et al. |
| 9,024,884 | B2 | 5/2015 | Lengeling et al. |
| 9,075,429 | B1* | 7/2015 | Karakotsios .......... G06F 3/0304 |
| 9,104,886 | B1 | 8/2015 | Dolbakian et al. |
| 9,141,280 | B2 | 9/2015 | Van Eerd et al. |
| 9,292,129 | B2 | 3/2016 | Tsang et al. |
| 9,411,467 | B2 | 8/2016 | Argiro |
| 9,430,140 | B2 | 8/2016 | Reuschel et al. |
| 9,529,514 | B2 | 12/2016 | Saint Clair |
| 9,560,076 | B2 | 1/2017 | Schultz et al. |
| 9,576,105 | B2 | 2/2017 | Cho |
| 9,588,680 | B2 | 3/2017 | Van Eerd et al. |
| 9,590,968 | B2 | 3/2017 | Stollman |
| 9,665,259 | B2 | 5/2017 | Lee et al. |
| 9,715,476 | B2 | 7/2017 | Megiddo et al. |
| 9,746,981 | B2 | 8/2017 | Zachut et al. |
| 9,747,499 | B2 | 8/2017 | Kim et al. |
| 9,749,395 | B2 | 8/2017 | Dawson et al. |
| 9,769,216 | B2 | 9/2017 | Gaetano, Jr. |
| 9,774,653 | B2 | 9/2017 | Hinckley et al. |
| 9,794,306 | B2 | 10/2017 | Riecken et al. |
| 9,883,138 | B2 | 1/2018 | Chen et al. |
| 9,898,663 | B2 | 2/2018 | Wexler et al. |
| 9,924,019 | B2 | 3/2018 | Jeganathan et al. |
| 9,990,814 | B1 | 6/2018 | Eidam et al. |
| 10,055,046 | B2 | 8/2018 | Lengeling et al. |
| 10,096,011 | B2 | 10/2018 | Camp |
| 10,230,844 | B1 | 3/2019 | Ellis et al. |
| 10,262,509 | B1 | 4/2019 | Kourtney et al. |
| 10,332,200 | B1* | 6/2019 | Fournier ................ G06Q 40/00 |
| 10,367,912 | B2 | 7/2019 | Saint Clair |
| 10,484,437 | B2 | 11/2019 | Banyai et al. |
| 10,485,341 | B2 | 11/2019 | Dash et al. |
| 10,540,014 | B2 | 1/2020 | Gribetz et al. |
| 10,565,643 | B2 | 2/2020 | Rohn et al. |
| 10,567,481 | B2 | 2/2020 | Dawson et al. |
| 10,579,228 | B2 | 3/2020 | Vida et al. |
| 10,614,219 | B2 | 4/2020 | Knapp et al. |
| 10,891,688 | B1 | 1/2021 | Clausen et al. |
| 2001/0037287 | A1 | 11/2001 | Broadbent et al. |
| 2002/0070964 | A1 | 6/2002 | Botz et al. |
| 2003/0069828 | A1 | 4/2003 | Blazey et al. |
| 2003/0108241 | A1 | 6/2003 | Colmenarez et al. |
| 2004/0075642 | A1* | 4/2004 | Kisliakov ............ H04N 21/422 345/156 |
| 2004/0233216 | A1* | 11/2004 | Rekimoto ............. G06F 3/0486 345/592 |
| 2005/0178074 | A1 | 8/2005 | Kerosetz |
| 2005/0185825 | A1 | 8/2005 | Hoshino et al. |
| 2005/0289045 | A1 | 12/2005 | Lawson |
| 2007/0296545 | A1 | 12/2007 | Clare |
| 2007/0300307 | A1 | 12/2007 | Duncan |
| 2009/0056599 | A1 | 3/2009 | Turner et al. |
| 2009/0174673 | A1 | 7/2009 | Ciesla |
| 2009/0315830 | A1 | 12/2009 | Westerman |
| 2010/0062811 | A1 | 3/2010 | Park et al. |
| 2010/0238119 | A1 | 9/2010 | Dubrovsky et al. |
| 2010/0302168 | A1 | 12/2010 | Giancarlo et al. |
| 2011/0035695 | A1 | 2/2011 | Fawcett et al. |
| 2011/0256019 | A1* | 10/2011 | Gruen .................. G06F 1/1601 422/24 |
| 2011/0260976 | A1 | 10/2011 | Larsen et al. |
| 2012/0032783 | A1* | 2/2012 | Ahn ...................... G06F 3/1423 340/6.1 |
| 2012/0119999 | A1 | 5/2012 | Harris |
| 2012/0204116 | A1* | 8/2012 | Patil ....................... G06F 9/451 715/753 |
| 2012/0204117 | A1 | 8/2012 | Patil et al. |
| 2013/0249947 | A1 | 9/2013 | Reitan |
| 2014/0012754 | A1 | 1/2014 | Hanson et al. |
| 2014/0168107 | A1* | 6/2014 | Kim ..................... G06F 3/0488 345/173 |
| 2015/0020191 | A1 | 1/2015 | Vida et al. |
| 2015/0059002 | A1 | 2/2015 | Balram et al. |
| 2015/0109099 | A1 | 4/2015 | Birkel et al. |
| 2015/0135101 | A1 | 5/2015 | Ellis et al. |
| 2015/0221035 | A1 | 8/2015 | Anderson et al. |
| 2015/0278534 | A1 | 10/2015 | Thiyagarajan et al. |
| 2015/0279310 | A1* | 10/2015 | Itakura ..................... G06T 1/20 345/520 |
| 2016/0034901 | A1* | 2/2016 | Ferren .................. G06F 3/0236 705/44 |
| 2016/0037346 | A1 | 2/2016 | Boettcher et al. |
| 2016/0071224 | A1 | 3/2016 | Huang |
| 2016/0180614 | A1 | 6/2016 | Micali et al. |
| 2016/0191576 | A1 | 6/2016 | Thompson et al. |
| 2017/0099453 | A1 | 4/2017 | Junuzovic et al. |
| 2017/0103440 | A1 | 4/2017 | Xing et al. |
| 2017/0115742 | A1 | 4/2017 | Xing et al. |
| 2017/0118645 | A1 | 4/2017 | Zarakas et al. |
| 2017/0169506 | A1 | 6/2017 | Wishne et al. |
| 2017/0180336 | A1 | 6/2017 | Josephson et al. |
| 2017/0227938 | A1 | 8/2017 | Wexler et al. |
| 2017/0278358 | A1 | 9/2017 | Ino et al. |
| 2018/0089349 | A1 | 3/2018 | Rezgui |
| 2018/0096386 | A1 | 4/2018 | Aggarwal et al. |
| 2018/0101985 | A1 | 4/2018 | Jones-McFadden et al. |
| 2018/0108207 | A1 | 4/2018 | Lyons et al. |
| 2018/0122187 | A1 | 5/2018 | Moore et al. |
| 2018/0268747 | A1 | 9/2018 | Braun |
| 2018/0293087 | A1 | 10/2018 | Lee et al. |
| 2018/0301111 | A1 | 10/2018 | Park et al. |
| 2018/0356885 | A1 | 12/2018 | Ross et al. |
| 2018/0357850 | A1 | 12/2018 | Moore et al. |
| 2019/0019011 | A1 | 1/2019 | Ross et al. |
| 2019/0034895 | A1 | 1/2019 | Camp |
| 2019/0108524 | A1 | 4/2019 | Nicholson et al. |
| 2019/0121522 | A1 | 4/2019 | Davis et al. |
| 2019/0228494 | A1 | 7/2019 | Stasi et al. |
| 2019/0228609 | A1 | 7/2019 | Nguyen et al. |
| 2019/0268321 | A1 | 8/2019 | Kim et al. |
| 2019/0306709 | A1 | 10/2019 | Kim et al. |
| 2019/0360259 | A1 | 11/2019 | Green et al. |
| 2020/0034106 | A1 | 1/2020 | Jain et al. |
| 2020/0056418 | A1 | 2/2020 | Dobbins et al. |
| 2020/0064960 | A1* | 2/2020 | Munemoto ......... G06F 3/04883 |

(56) References Cited

U.S. PATENT DOCUMENTS

| | | | |
|---|---|---|---|
| 2020/0066079 A1 | 2/2020 | Swaine et al. | |
| 2020/0218493 A1* | 7/2020 | Sim | H04L 67/36 |
| 2020/0301720 A1 | 9/2020 | Choi | |

FOREIGN PATENT DOCUMENTS

| | | |
|---|---|---|
| CN | 108255462 | 7/2018 |
| CN | 109471687 | 3/2019 |
| CN | 109983491 | 7/2019 |
| EP | 2 919 209 | 9/2015 |
| JP | 6555129 | 8/2019 |
| KR | 2019002815 A | 1/2019 |
| WO | WO-2019/019743 | 1/2019 |
| WO | WO-2019/098992 | 5/2019 |

OTHER PUBLICATIONS

Dani Deahl, This All-In-One Smart Desk Has Three Screens and a Built-In Scanner; Jun. 25, 2018. 2 Pages.

Scott Cary; How Capital One Taught Amazon's Alexa Ai Assistant to Help You Manage Your Money. Nov. 30, 2016; 4 Pages.

\* cited by examiner

TACTILE INPUT DEVICE FOR A TOUCH SCREEN

CROSS-REFERENCE TO RELATED APPLICATIONS

This application is a continuation-in-part of U.S. patent application Ser. No. 17/079,971 filed Oct. 26, 2020, a continuation-in-part of U.S. patent application Ser. No. 17/079,961 filed Oct. 26, 2020, and a continuation-in-part of U.S. patent application Ser. No. 17/079,958 filed Oct. 26, 2020, each of which are incorporated herein by reference in their entirety.

TECHNICAL FIELD

This application relates generally to the use of a smart table to improve efficiency and ease of conducting transactions at a provider location associated with a provider. More specifically, this application relates to systems and methods for providing tactile input on a touch screen, including the use of a tactile input device.

BACKGROUND

Customers of a provider are able to access a variety of services through applications, such as mobile applications on user devices, to perform various tasks. For example, customers may use an internet enabled application to conduct transactions, change settings, and carry out other actions related to a customer account or with respect to a product offered by the provider. However, certain transactions and tasks may require a customer to visit a provider location (e.g., due to security, needing to meet with a provider representative) where inputs are required to be made by the user on hardware at the provide location, such as on a touchscreen interface with which the user is not accustomed.

SUMMARY

One example embodiment relates to a tactile user input system associated with a provider. The tactile user input system comprises a tactile input device and a smart table. The smart table comprises a network interface and a processing circuit. The network interface is structured to facilitate data communication with the tactile input device via a network. The processing circuit comprises a processor and a memory. The processing circuit is structured to sense a placement of the tactile input device on the smart table. The processing circuit is further structured to determine a necessary user input. The processing circuit is further structured to determine a location of the tactile input device on the smart table. The processing circuit is further structured to rearrange a user interface of the smart table based on at least one of the necessary user input or the location of the tactile input device on the smart table. The processing circuit is further structured to communicate a necessary input configuration to tactile input device to be used by the tactile input device to generate a tactile user interface having an appropriate layout based on the necessary input configuration.

Another example embodiment relates to a tactile input device. The tactile input device comprises a touch screen and a tactile overlay. The tactile overlay including a plurality of selectively inflatable keys configured to selectively generate a plurality of tactile user interfaces, each of the plurality of tactile user interfaces having a unique layout. The tactile input device further comprises at least one processing circuit configured to receive a necessary input configuration from a smart table. The processing circuit is further configured to generate a tactile user interface having an appropriate layout based on the necessary input configuration. The processing circuit is further configured to receive, by the touch screen, a user input. The processing circuit is further configured to communicate the user input to the smart table.

Another example embodiment relates to a tactile input device. The tactile input device comprises a tactile overlay including a plurality of selectively inflatable keys. The tactile overlay is configured to selectively generate a plurality of tactile user interfaces. Each of the plurality of tactile user interfaces has a unique layout and at least one processing circuit. The at least one processing circuit is configured to receive a necessary input configuration from a smart table. The processing circuit is further configured to generate a tactile user interface having an appropriate layout based on the necessary input configuration.

These and other features, together with the organization and manner of operation thereof, will become apparent from the following detailed description when taken in conjunction with the accompanying drawings.

DETAILED DESCRIPTION

Figure 1:
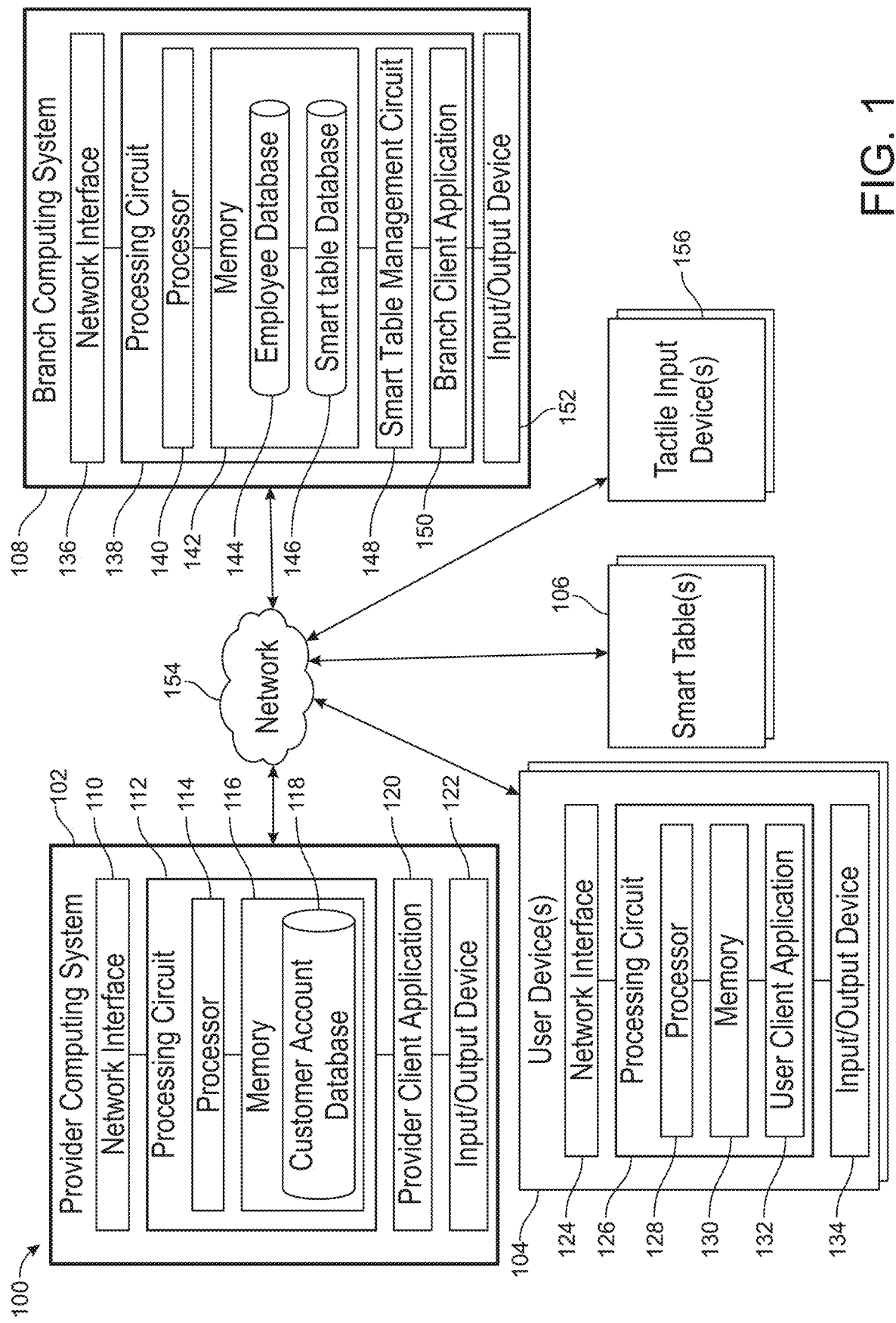
FIG. 1 is a block diagram of a smart table system including a provider computing system and a smart table, according to example embodiments.

Referring generally to the figures, apparatuses, systems and methods for a tactile input device are shown and described. The apparatuses, systems and methods described herein enhance the input of information to a smart table by utilizing a tactile input device that allows for more efficient input and the ability to enter more types of information than can be input in the smart table alone.

For example, the tactile input allows for the user to input information more efficiently. This is achieved by providing a tactile overlay that provides the user a tactile reference for the location of keys. This allows the user to more efficiently enter information as they are able to enter information without the necessity of looking at their fingers when typing. The tactile input device further improves the functioning of a smart table by allowing for an encrypted separation between the input device and the smart table. Further, the tactile input device allows for the determination of the weight of a desired item (e.g., safety deposit box, currency).

The embodiments of the tactile user input system described herein improve current user input systems by providing the ability to modify a single user input device to allow for a multitude of different layouts (e.g., alphanumeric, numeric, signature box, weight measurement). This improves efficiency and enhances the functioning of a computer, as the smart table doesn't need to connect to a multitude of different input devices. Additionally, the tactile input device may be configured to change the layout dependent on the step in the banking session, or a field of focus. This ability may also increase the efficiency of information entry as well as the functioning of the computer, as multiple input devices are not needed.

Further, the embodiments of the tactile user input system described herein improve current user input systems by allowing the banking session to be completed, at least partially, by the tactile input device. For example, the customer may be provided with the tactile input device and be able enter general information while waiting for a smart table to become available. Additionally, the tactile input device may allow for a single tactile input device to be used and transferred between a branch employee and a customer through the banking session. Further, the tactile input device may improve the efficiency of a banking session by allowing a user to continue a banking session remotely to the smart table. For example, a branch employee may be able to take the tactile input device to a manager of a branch employee for approval or authorization, then continue the banking session on the smart table.

Before turning to the figures, which illustrate certain exemplary embodiments in detail, it should be understood that the apparatuses, systems and methods for a tactile input devices described herein are not limited to the details or methodology set forth in the description or illustrated in the figures. It should also be understood that the terminology used herein is for the purpose of description only and should not be regarded as limiting.

Referring to FIG. 1, a block diagram of a smart table system 100 is shown, according to example embodiments. The smart table system 100 includes a provider computing system 102 associated with a provider, such as a service provider, bank, or financial institution. The smart table system 100 further includes one or more user devices (e.g., user device 104), one or more smart tables (e.g., smart table 106), and a branch computing system 108 (e.g., a computing system of a branch location of the FI). In some embodiments, the provider computing system 102, user device 104 (as well as any additional user devices), smart table 106 (and any additional smart tables), and branch computing system 108 are directly communicably coupled. In some embodiments, the components of smart table system 100 may be communicably and operatively coupled to each other over a network, such as network 154, that permits the direct or indirect exchange of data, values, instructions, messages, and the like (represented by the double-headed arrows in FIG. 1). The network 154 may include one or more of a cellular network, the Internet, Wi-Fi™, Wi-Max™, a proprietary banking network, a proprietary retail or service provider network, and/or any other kind of wireless or wired network.

Each system or device in smart table system 100 may include one or more processors, memories, network interfaces and user interfaces. The memory may store programming logic that, when executed by the processor, controls the operation of the corresponding computing system or device. The memory may also store data in databases. For example, memory 142 may store programming logic that when executed by processor 140 within processing circuit 138, causes employee database 144 to update information for an employee account with communications received from a user device 104. The network interfaces (e.g., network interface 110 of provider computing system 102) may allow the computing systems and devices to communicate wirelessly or otherwise. The various components of devices in smart table system 100 may be implemented via hardware (e.g., circuitry), software (e.g., executable code), or any combination thereof. Devices and components in FIG. 1 can be added, deleted, integrated, separated, and/or rearranged in various embodiments of the disclosure.

The provider computing system 102 may be managed by a provider, such as a credit card issuer, a bank, a retailer, a service provider, and/or the like. The provider computing system 102 includes a network interface 110, a processing circuit 112, and an input/output device 122. The network interface 110 is structured and used to establish connections with other computing systems and devices (e.g., the user devices 104, the smart tables 106, the branch computing system 108, etc.) via the network 154. The network interface 110 includes program logic that facilitates connection of the provider computing system 102 to the network 154. For example, the network interface 110 may include any combination of a wireless network transceiver (e.g., a cellular modem, a Bluetooth™ transceiver, a WiFi™ transceiver, etc.) and/or a wired network transceiver (e.g., an Ethernet transceiver). In some arrangements, the network interface 110 includes the hardware and machine-readable media sufficient to support communication over multiple channels of data communication. Further, in some arrangements, the network interface 110 includes cryptography capabilities to establish a secure or relatively secure communication session in which data communicated over the session is encrypted.

The processing circuit 112 includes a processor 114, a memory 116, and a provider client application 120. The memory 116 may be one or more devices (e.g., RAM, ROM, Flash memory, hard disk storage) for storing data and/or computer code for completing and/or facilitating the various processes described herein. The memory 116 may be or include non-transient volatile memory, non-volatile memory, and non-transitory computer storage media. Memory 116 may include database components, object code components, script components, or any other type of information structure for supporting the various activities and information structures described herein. Memory 116 may be communicably coupled to the processor 114 and include computer code or instructions for executing one or more processes described herein. The processor 114 may be implemented as one or more application specific integrated circuits (ASICs), field programmable gate arrays (FPGAs), a group of processing components, or other suitable electronic processing components. As such, the provider computing system 102 is configured to run a variety of application programs and store associated data in a database of the memory 116. One such application may be the provider client application 120.

The memory 116 may store a customer account database 118, according to some embodiments. The customer account database 118 may be configured to store updated personal information for customer accounts associated with the provider (e.g., the FI). For example, the customer account database 118 saves personal user information, such as name, age, gender, address, education, occupation, etc., customer preferences, such as notification preferences, security preferences, etc., and authentication information, such as customer passwords, biometric data for the customer, etc. In some embodiments, the customer account database 118 includes a token vault that stores an associated customer token and/or device token for each customer account. The customer account database 118 may further be configured to store financial data for each customer account, such as past transactions, different banking account information (e.g., balances, debt, type of account, etc.), investments, loans, mortgages, and so on.

In some embodiments, the provider client application 120 may be incorporated with an existing application in use by the provider computing system 102 (e.g., a mobile banking application, a service provider application, etc.). In other embodiments, the provider client application 120 is a separate software application implemented on the provider computing system 102. The provider client application 120 may be downloaded by the provider computing system 102 prior to its usage, hard coded into the memory 116 of the provider computing system 102, or be a network-based or web-based interface application such that the provider computing system 102 may provide a web browser to access the application, which may be executed remotely from the provider computing system 102. Accordingly, the provider computing system 102 may include software and/or hardware capable of implementing a network-based or web-based application. For example, in some instances, the provider client application 120 includes software such as HTML, XML, WML, SGML, PHP (Hypertext Preprocessor), CGI, and like languages.

In the latter instance, a user (e.g., a provider employee) may have to log onto or access the web-based interface before usage of the application. In this regard, the provider client application 120 may be supported by a separate computing system including one or more servers, processors, network interface, and so on, that transmit applications for use to the provider computing system 102.

In certain embodiments, the provider client application 120 includes an application programming interface (API) and/or a software development kit (SDK) that facilitate the integration of other applications with the provider client application 120. For example, the provider client application 120 is configured to utilize the functionality of the branch computing system 108 by interacting with the branch client application 150 through an API.

Still referring to FIG. 1, the input/output device 122 is structured to receive communications from and provide communications to provider employees associated with the provider computing system 102. The input/output device 122 is structured to exchange data, communications, instructions, etc. with an input/output component of the provider computing system 102. In one embodiment, the input/output device 122 includes communication circuitry for facilitating the exchange of data, values, messages, and the like between the input/output device 122 and the components of the provider computing system 102. In yet another embodiment, the input/output device 122 includes machine-readable media for facilitating the exchange of information between the input/output device and the components of the provider computing system 102. In yet another embodiment, the input/output device 122 includes any combination of hardware components, communication circuitry, and machine-readable media.

In some embodiments, the input/output device 122 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output device 122 may provide an interface for the user to interact with various applications (e.g., the provider client application 120) stored on the provider computing system 102. For example, the input/output device 122 includes a keyboard, a keypad, a mouse, joystick, a touch screen, a microphone, and the like. As another example, input/output device 122, may include, but is not limited to, a television monitor, a computer monitor, a printer, a facsimile, a speaker, and so on.

The branch computing system 108 similarly includes a network interface 136, a processing circuit 138, and an input/output device 152. The network interface 136, the processing circuit 138, and the input/output device 152 may function substantially similar to and include the same or similar components as the components of provider computing system 102, such as the network interface 110, the processing circuit 112, and the input/output device 122, described above. As such, it should be understood that the description of the network interface 110, the processing circuit 112, and the input/output device 122 of the provider computing system 102 provided above may be similarly applied to the network interface 136, the processing circuit 138, and the input/output device 152 of the branch computing system 108.

For example, the network interface 136 is similarly structured and used to establish connections with other computing systems (e.g., the provider computing system 102, the user devices 104, and/or the smart tables 106) via the network 154. The network interface 136 may further include any or all of the components discussed above, with reference to the network interface 110.

The processing circuit 138 similarly includes a processor 140 and a memory 142. The processor 140 and the memory 142 are substantially similar to the processor 114 and the memory 116 described above, with reference to the provider computing system 102. In some embodiments, the memory 142 includes an employee database 144 and a smart table database 146. The employee database 144 may be structured to store data concerning each employee associated with the branch location. In some embodiments, the employee database 144 may store data regarding an identification number, a job position, authorization information, contact information, a schedule, customer history, work history, an associated user device 104, credentials, and so forth, of an employee that works at the branch location associated with the branch computing system 108. For example, the employee database 144 may save biometric information (e.g., a fingerprint scan, an eye scan, a voice memo, etc.) and a password (e.g., PIN, alphanumeric code, QR code, barcode, etc.) for each employee at the branch location. As another example, the employee database 144 stores security and data access rights for each employee that are utilized in conducting particular transactions (high-risk transactions, transactions with high-confidentiality customers, etc.).

Additionally, the employee database 144 may include the types of trainings each employee has received, the clearances that each employee has obtained, a trustworthiness score for each employee, and any other pertinent information pertaining to each employee that may be used to determine the employees qualifications for performing various transactions and other tasks using a smart table 106.

The smart table database 146 may be structured to store data for each smart table 106 at the branch location. The smart table database 146 may save information regarding an identification number of each smart table 106, service history information (e.g., a last date a smart table was serviced for repairs and/or updates), transaction history information (e.g., number of customers that used the smart table 106), scheduling information (e.g., customers assigned to the smart table 106 for an upcoming smart table banking session, and/or power status (e.g., charging, operating on a low battery level, etc.). For example, the smart table database 146 may store a schedule of which customers will be using a particular smart table 106 at the branch location. Beneficially, this may allow for branch managers to more effectively plan out smart table banking sessions and decrease the likelihood of scheduling conflicts, such as two customers having conflicting sessions at the same smart table 106.

The processing circuit 138 also is shown to include a smart table management circuit 148. In some embodiments, the smart table management circuit 148 is configured to receive new data (e.g., from the network 154) relating to employees and smart tables 106 at a branch location. The smart table management circuit 148 may then update a correct, corresponding database (e.g., employee database 144 or smart table database 146). In some embodiments, the smart table management circuit 148 is configured to receive requests from customers for an appointment at a smart table 106. The smart table management circuit 148 may then schedule the appointment based on what the client wants to accomplish during the banking session (e.g., to ensure the assigned smart table 106 has the necessary capabilities, such as a functional cash dispenser) and the available smart tables 106 during a time slot desired by the customer.

The smart table management circuit 148 may also be configured to identify which employees may be needed at a smart table 106 in order to conduct a planned transaction with a customer during a banking session. For example, in generating a request for a smart table banking session, a customer may be asked (e.g., via the user device 104 associated with the customer) what type of transaction or banking task does the customer want to complete during the smart table session. In some embodiments, the smart table management circuit 148 may generate and transmit a notification to user device 104 of an employee that a new smart table banking session, assigned to the employee, has been scheduled.

Although the employee database 144, smart table database 146, and smart table management circuit 148 are shown as being a part of the branch computing system 108, these components may alternatively be a part of the provider computing system 102. In other embodiments, each of the provider computing system 102 and the branch computing system 108 may include a corresponding smart table management circuit the same as or similar to the smart table management circuit 148.

The branch computing system 108 is similarly structured as the provider computing system 102 to run a variety of application programs and store associated data in a database of the memory 142. One such application may be the branch client application 150, for example.

The branch client application 150 may be substantially similar to the provider client application 120, but may instead be tailored toward branch employees or a branch manager at the branch location. For example, branch client application 150 is structured to generate user interfaces to display on a smart table 106 to facilitate improved customer experiences and employee interactions during an established banking session. Particularly, the branch client application 150 is configured to communicate with the provider computing system 102, the user devices 104 (e.g., customer user devices and employee user devices), and smart tables 106 to receive instructions or documents from the provider computing system 102 and/or the branch computing system 108 to complete specific tasks during a banking session at a smart table 106. Furthermore, the branch client application 150 may be configured to communicate reminders to user devices 104 of employees regarding upcoming banking sessions at a smart table 106 and/or ongoing banking sessions at a smart table 106 to perform a task associated with the banking session. For example, the branch client application 150 may be configured to generate a reminder for a branch employee to prepare a smart table 106 for an upcoming banking session. Accordingly, the branch client application 150 is communicably coupled to the provider computing system 102 (e.g., through interactions with the provider client application 120), the user devices 104 (e.g., through interactions with the user client application 132), and the smart tables 106 (e.g., through interactions with the smart table client application 218 (FIG. 2)).

The branch client application 150 may thus communicate with the provider computing system 102, the user devise 104, and the smart tables 106 to perform a variety of functions. For example, the branch client application 150 is configured to reset a display of a smart table 106 (e.g., reset a display to a generic welcome display or sleep mode display) at the end of a banking session with a customer. As such, the branch client application 150 allows for a branch manager and branch employees associated with the branch location to monitor and update user interfaces of the smart tables 106 before, during, and after banking sessions with one or more customers paired to one of the smart tables 106.

The input/output device 152 may function substantially similarly to and include the same or similar components as the input/output device 122 described above, with reference to the provider computing system 102. Accordingly, it will be understood that the description of the input/output device 122 described above may also be applied to the input/output device 152 of the branch computing system 108. As an example, the input/output device 152 is similarly structured to receive communications from and provide communications to user devices 104 of branch employees and/or the branch manager associated with the branch computing system 108.

The smart table system 100 also includes one or more user devices 104, according to some embodiments. The user devices 104 may be a variety of suitable user computing devices. For example, the user devices 104 may comprise mobile phones. In other embodiments, the user devices 104 include personal computers (e.g., desktop computers or laptop computers), tablets, smart watches or other wearable devices, headphones, smart vehicle voice/touch command systems, virtual/augmented reality (VR/AR) systems (e.g., smart glasses), appliances, internet of things (IoT) devices, voice assistants, at-home touch screen display systems, and/or any other suitable user computing devices capable of accessing and communicating using local and/or global networks (e.g., the network 154). The user devices 104 may be associated with employees or with customers of the provider (e.g., customers at the FI). As such, the customer account database 118 may be further configured to store device information concerning each user device 104 associated with a customer of the provider. Similarly, the employee database 144 may be further configured to store device information pertaining to each user device 104 of an employee at a branch location. For example, the device information may include a device form (e.g., the type of user device 104), a set of device capabilities (e.g., types of input/output devices, device mobility, device communication capabilities), device location information, and/or device identification and authentication information (e.g., an encrypted device token for each user device 104, user authentication information, such as a PIN or biometric data, associated with each user device 104, etc.).

The user devices 104 may each similarly include a network interface 124, a processing circuit 126, and an input/output device 134. The network interface 124, the processing circuit 126, and the input/output device 134 may be structured and function substantially similar to and include the same or similar components as the network interface 110, the processing circuit 112, and the input/output device 122 described above, with reference to the provider computing system 102. Therefore, it should be understood that the description of the network interface 110, the processing circuit 112, and the input/output device 122 of the provider computing system 102 provided above may be similarly applied to the network interface 124, the processing circuit 126, and the input/output device 134 of each of the user devices 104.

In some embodiments, the network interface 124 is similarly structured and used to establish connections with other computing systems (e.g., the provider computing system 102, the branch computing system 108, other user devices 104, and the smart tables 106) via the network 154. The network interface 124 may further include any or all of the components discussed above, with reference to the network interface 110.

The processing circuit 126 similarly includes a memory 130 and a processor 128. The memory 130 and the processor 128 are substantially similar to the memory 116 and the processor 114 described above. Accordingly, the user devices 104 are similarly configured to run a variety of application programs and store associated data in a database of the memory 130. For example, the user devices may be configured to run an application such as the user client application 132.

The user client application 132 may be substantially similar to the provider client application 120, the branch client application 150, and the smart table client application 218 (FIG. 2), but may instead be specifically tailored to the user associated with the user devices 104. For example, the user client application 132 is similarly structured to selectively provide displays and/or audio/visual communications to each user device 104 to allow for improved interactions between a customer and branch employees, branch managers, and provider employees.

Particularly, the user client application 132 is configured to communicate with the provider computing system 102, the branch computing system 108, and the smart tables 106 to facilitate user interactions with a smart table 106 during a banking session at a branch location. As such, the user devices 104 are communicably coupled to the provider computing system 102 (e.g., through interactions with the provider client application 120), the branch computing system 108 (e.g., through interactions with the branch client application 150), and the smart tables 106 (e.g., through interactions with the smart table client application 218 (FIG. 2)).

The user client application 132 may therefore communicate with the provider computing system 102, the smart tables 106, and the branch computing system 108 to perform a variety of functions. For example, the user client application 132 is similarly configured to receive user inputs (e.g., via a user interface of the user device 104) to complete financial transactions during a user session with a smart table 106, depending on whether the individual associated with the user device 104 is an employee or a customer. Additionally, the user client application 132 is configured to output information to a display of the user device 104 regarding information on the financial transaction. For example, the user client application 132 is configured to generate a user interface to show graphics regarding a financial history of a customer.

The user client application 132 is further configured to allow for communication with the provider client application 120 to allow a user associated with the various user devices 104 to update account information and/or provide feedback during a banking session with a smart table 106. Accordingly, the user client application 132 facilitates effective communication with a branch manager, other branch employees, the provider employees, and/or other customers (e.g., during a banking session with two customers, such as a mother and daughter) during a connected session with a smart table 106.

The user client application 132 may also be structured to allow the user devices 104 to retrieve and submit documents, forms, and/or any type of necessary information to and/or from a smart table 106 during an established session, as required to complete certain financial tasks. In some instances, the user client application 132 may be configured to automatically retrieve and/or submit documents, forms, or other necessary information to and/or from a smart table 106 in response to the establishment of a secure connection to the smart table 106. In some embodiments, the user client application 132 may be configured to temporarily store the various documents, forms, and/or necessary information, which may then be selectively transmitted to the smart table 106 in response to a user input from a customer or employee (e.g., received via the input/output device 134).

In some embodiments, the user client application 132 may be configured to temporarily store the various documents, forms, and/or necessary information and then selectively transmit the various documents, forms, and/or necessary information to the smart table 106 in response to a customer's arrival at a branch location. For example, the user device 104 may automatically connect to the branch computing system 108 and/or the one or more smart tables 106 when the user device 104 is within range of a network or communication device associated with the branch computing system 104 and/or the one or more smart tables 106.

In some embodiments, a customer or employee may identify various levels of authority associated with each of the user devices 104. For example, in some implementations, a user may set a first user device 104 as a primary user device and a second user device 104 as a secondary user device. In some instances, there may be various approved users of the user devices 104, excluding the user, such as family members, caretakers, business partners for customers, or other branch employees, a branch manager, a supervising employee for employees at the branch location. As such, in some embodiments, a primary user device may have the authority to veto or cancel the actions taken by a secondary user device.

Furthermore, the user client application 132 may be configured to provide a device status for each user device 104 to the banking session management circuit 210 (FIG. 2) of a smart table 106. The device status may include both a device location and an indication of whether the respective user device 104 is active. For example, the user client application 132 may be configured to automatically, periodically, and/or selectively provide geographical location information to the banking session management circuit 210. Additionally, the user client application 132 may be configured to send the banking session management circuit 210 a notification and/or an update when a given user device 104 is active.

In some embodiments, a user device 104 may be considered active if, for example, the user device 104 is currently being used (e.g., by a customer or by an employee during a banking session with a smart table 106), a user has indicated that the provider computing system 102, the branch computing system 108, and/or the smart tables 106 are permitted to send/retrieve data to/from the user device 104, and/or the user device 104 is within a predetermined distance from the branch computing system 108 or one of the smart tables 106. In some embodiments, there may be additional manners in which the user device 104 may be considered active.

The input/output device 134 of each user device 104 may function substantially similar to and include the same or similar components as the input/output device 122 previously described, with reference to the provider computing system 102. As such, it should be understood that the description of the input/output device 122 provided above may also be applied to the input/output device 134 of each of the user devices 104. In some embodiments, the input/output device 134 of each user device 104 is similarly structured to receive communications from and provide communications to a user (e.g., customer or employee) associated with the plurality of user devices 104.

For example, the input/output device 134 may include one or more user interfaces, which may include one or more biometric sensors (such as an iris scanner, a fingerprint scanner, a heart monitor that identifies cardiovascular signals, etc.). The input/output device 134 may also include components that provide perceptible outputs (such as displays and light sources for visually-perceptible elements, a speaker for audible elements, and haptics for perceptible signaling via touch, etc.) and/or that permit the user to enter inputs (such as a stylus or force sensor for detecting pressure on a display screen). One or more user devices 104 may include one or more locations sensors to allow the user devices 104 to detect its location relative to other physical objects (e.g., a smart table 106 or other user devices) or geographic locations. Example locations sensors may include global positioning system (GPS) devices and other navigation and geolocation devices, digital compasses, gyroscopes and other orientation sensors, as well as proximity sensors or other sensors that permit the user device 104 to determine the presence and relative distance of nearby devices, objects, and/or locations.

Still referring to FIG. 1, the smart table system 100 includes one or more smart tables 106. The smart tables 106 may be tables of varying sizes integrated with cash handling endpoints. Furthermore, the smart tables 106 may provide a shared graphical user interface for scenarios in which a display screen of a user device is not the right size for an improved and efficient customer experience. In some embodiments, each of the smart tables 106 are associated with a smart table identifier, such as a numeric or alphanumeric code, to identify the respective smart table to the branch computing system 108, the provider computing system 102, and the user devices 104. For example, in response to walking into a lobby of a branch location for a scheduled banking session, a user device 104 associated with the customer may indicate to the customer which smart table 106 to go to in order to initiate the session. While described with regards to a FI, the smart tables 106 may be used in other scenarios. For example, the smart tables 106 may be used at a car dealership or car rental company, a hotel, a booking agent, and/or a medical office. The features of the smart tables 106 are described in greater detail below, with reference to FIG. 2.

The smart table system 100 may include one or more tactile input devices 156. The tactile input devices 156 may be devices with an adjustable tactile overlay on an independent touch screen. In some embodiments, the tactile input devices 156 may be an adjustable tactile overlay used in conjunction with the touchscreen of the smart table 106 to increase the efficiency of data entry and increase the functionality of the smart table 106. In some embodiments, each of the tactile input devices 156 are associated with a tactile input device identifier configured to identify the respective tactile input device to the branch computing system 108, the provider computing system 102, the user device 104, and/or the smart table 106. In some instances, the tactile input device identifier may be a numeric or alphanumeric code. While described with regards to a financial institution (FI) and in conjunction with a smart table 106, the tactile input devices 156 may be used in other scenarios. The features of the tactile input device are described in greater detail below, with reference to FIG. 11.

Figure 2:
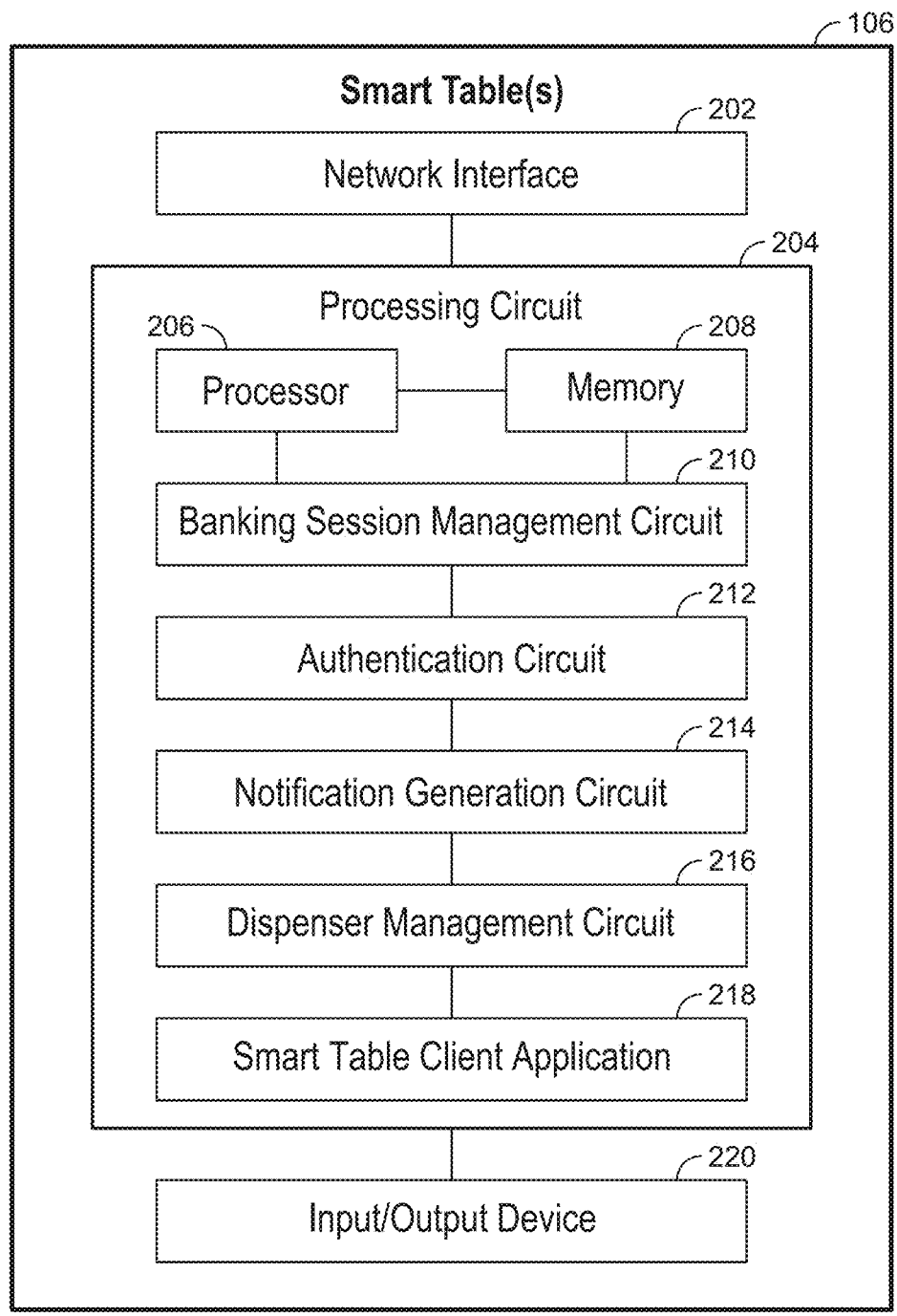
FIG. 2 is a block diagram of the smart table of FIG. 1, according to example embodiments.

Referring now to FIG. 2, a block diagram of the smart tables 106 is shown, according to some embodiments. The smart tables 106 each similarly include a network interface 202, a processing circuit 204, and an input/output device 220. The network interface 202, the processing circuit 204, and the input/output device 220 may function substantially similar to and include the same or similar components as the network interface 110, the processing circuit 112, and the input/output device 122 described above, with reference to the provider computing system 102. Thus, it should be understood that the description of the network interface 110, the processing circuit 112, and the input/output device 122 of the provider computing system 102 provided above may be similarly applied to the network interface 202, the processing circuit 204, and the input/output device 220 of each of the smart tables 106.

For example, the network interface 202 is similarly structured and used to establish connections with other computing systems (e.g., the provider computing system 102, the branch computing system 108, the user devices 104) via the network 154. The network interface 202 may further include any or all of the components discussed above, with reference to the network interface 110.

The processing circuit 204 similarly includes a processor 206 and a memory 208. The processor 206 and the memory 208 are substantially similar to the processor 114 and the memory 116 described above. As such, the smart tables 106 are similarly configured to run a variety of application programs and store associated data in a database of the memory 208. For example, the smart tables 106 may be configured to run the application the smart table client application 218.

The smart table client application 218 may be substantially similar to the provider client application 120 and the branch client application 150, but may instead be specifically for personalized banking sessions between customers and employees at the bank. For example, the smart table client application 218 is similarly structured to provide displays to each customer user device 104 to facilitate improved interactions between customers and specific branch employees associated with each smart table 106. Particularly, smart table client application 218 is configured to communicate with the provider computing system 102, the branch computing system 108, and the user devices 104 to receive instructions and reminders from the provider computing system 102 and/or the branch computing system 104 for the branch employees associated with each smart table 106 to perform various tasks associated with a banking session. Accordingly, the smart tables 106 are communicably coupled to the provider computing system 102 (e.g., through interactions with the provider client application 120), the branch computing system 108 (e.g., through interactions with the branch client application 150), and the user devices 104 (e.g., through interactions with the user client application 132).

The smart table client application 218 may therefore communicate with the provider computing system 102, the branch computing system 108, and the user devices 104 to perform several functions. For example, the smart table client application 218 is configured to receive data from the provider computing system 102 and/or the branch computing system 104 pertaining to necessary inputs for authenticating a particular transaction during a banking session. The smart table client application 218 is further configured to allow for communication with the provider client application 120 to allow the various branch employees that operate the smart tables 106 to provide questions or comments regarding any concerns with the smart tables. As such, the smart table client application 218 allows for the branch employees associated with the smart tables 106 to communicate with the customer, branch manager, and/or provider employees throughout the process of a banking session.

In further embodiments, the smart table client application 218 may communicate with the tactile input device 156 via a tactile input device client application 1110. Further, the smart table client application 218 may be configured to sense the location of the tactile input device 156 on the smart table 106 via various sensors. For example, the various sensors may include Bluetooth™ sensors, Near Field Communication (NFC) sensors, conductive sensors, etc. Based on the sensed location, the smart table client application 218 may rearrange various information and graphics on a user interface displayed to the user to ensure that the information and graphics are not blocked by the tactile input device 156. In some embodiments, wherein the tactile input device 156 does not comprise a touchscreen, the smart table client application 218 may rearrange the display of the smart table 106 to align a visual display of a QWERTY keyboard, a 10-key keyboard, or any other suitable keyboard graphic or designated input area that is necessary or desired for a given task with the tactile input device 156. In some instances, the tactile input device 156 may be made of a transparent material, such that the visual of the keyboard graphic or designated input area is shown through the tactile input device.

The input/output device 220 of each smart table 106 may function substantially similar to and include the same or similar components as the input/output device 134 described above, with reference to the user devices 104. Accordingly, it should be understood that the description of the input/output device 134 provided above may also be applied to the input/output device 220 of each of the smart tables 106. For example, the input/output device 220 of each smart table 106 is similarly structured to receive communications from and provide communications to customers paired with a smart table 106 and to the branch employee or branch employees associated with each smart table 106.

The processing circuit 204 also includes a banking session management circuit 210, an authentication circuit 212, a notification generation circuit 214, and a cash dispenser management circuit 216, for example. In other embodiments, the processing circuit 204 may contain more or less components than shown in FIG. 2. The components of FIG. 2 are meant for illustrative purposes only, and should not be regarded as limiting in any manner. The banking session management circuit 210 may be configured to detect a trigger event for a banking session with the smart table 106. A banking session may include one customer (e.g., the smart table 106 is configured as a self-service ATM), a branch employee and a customer, or a branch employee and more than one customer, according to some embodiments. For example, two customers that have a joint account together may participate in a banking session with a branch employee. In some embodiments, a trigger event includes detecting a user device 104 within a communication range of the smart table 106. In other embodiments, a trigger event includes the activation of a selectable icon on a graphical user interface of the smart table 106. In response to detecting a trigger event, the banking session management circuit 210 may be configured to send instructions to the notification generation circuit 214 to request input for customer and/or employee authentication.

In some embodiments, the banking session management circuit 210 is further configured to receive sensor data from the input/output device 220 of the smart table 106. For example, the banking session management circuit 210 may be configured to receive camera data of documents that a customer wants to scan and save, movement data from a motion detector, temperature sensor data, and so on. Additionally, the banking session management circuit 210 may determine when to send reminders to a user device 104 of the branch employee regarding a banking session (e.g., to fill out a certain form, to pre-load a compartment of the smart table 106) and/or when to send a session end reminder for a scheduled banking session. For example, the banking session management circuit 210 may be configured to track how much time is remaining in a scheduled session to wrap up a financial transaction with the customer.

The authentication circuit 212 may be configured to determine whether a user is authenticated to initiate a banking session and/or to complete certain financial tasks. For example, the authentication circuit 212 may be configured to request an authorization approval from the provider computing system 102 of a received PIN or biometric input. In some embodiments, the authentication circuit 212 is also configured to determine the level of authentication necessary to complete different types of financial tasks (e.g., withdrawal cash, take out a loan, make a new investment, etc.). The authentication circuit 212 may be configured to generate a score of how authenticated a user is during a banking session. For example, a user that entered both a biometric input and an alphanumeric passcode may receive a first score of 100% authenticated, and a user that only entered a PIN may receive a second score of 50% authenticated. The authentication circuit 212 is also configured to send instructions to the cash dispenser management circuit 216 in response to receiving an approved authorization (e.g., from the provider computing system via the network 154) to dispense cash to a customer for a withdrawal request.

The notification generation circuit 214 may be configured to create alerts regarding an upcoming banking session, an in-progress banking session, and/or a completed banking session, according to some embodiments. The notification generation circuit 214 may also receive instructions on the format of a notification from the banking session management circuit 210. In some embodiments, the notification generation circuit 214 is configured to instruct the input/output device 220 of the smart table 106 to provide audible and/or visual output to a customer regarding information displayed during a banking session. For example, the notification generation circuit 214 may be configured to cause a NFC icon on a graphical user interface of the smart table 106 to flash to indicate to a user to place a user device 104 on the NFC icon to pair to the smart table 106. As another example, the notification generation circuit 214 may be configured to generate a notification that outputs a voice-over indicating the banking session will terminate within a certain time interval, such as a five minute warning to complete any unfinished tasks.

Still referring to FIG. 2, the cash dispenser management circuit 216 may be configured to control the use of the cash dispenser of the smart table 106. In some embodiments, the cash dispenser management circuit 216 is further configured to determine when the amount of available cash at the smart table 106 is below a threshold value (e.g., $100). The cash dispenser management circuit 216 may then instruct the notification generation circuit 214 to create a notification of the low amount of cash at the smart table 106 to the branch computing system 108 and/or a user device 104 (e.g., a branch manager user device 104). In some embodiments, the cash dispenser management circuit 216 is also configured to transmit an instruction to update a balance of the customer account to the provider computing system 102, for example, after the transaction request is completed. The cash dispenser management circuit 216 may further be configured to instruct the input/output device 220 of the smart table 106 to print a receipt with transaction details, such as the amount of cash withdrawn, the time of the completed transaction, and/or an updated balance for the customer account used to complete the transaction.

The use of the smart table 106 within the smart table system 100 may beneficially reduce significant amounts of time to complete financial transactions during a banking session and/or fill out paperwork forms. Furthermore, the smart tables 106 may help improve transparency of customer account information and employee services and increase face-to-face time with the branch employees. By providing a larger graphical user interface to share customer account information, rather than on a tiny screen on a single user device, the smart tables 106 also increase the amount of inclusion for each party participating in the banking session. The smart tables 106 may additionally help inform customers of several choices and advise the customers by displaying information from the branch employee regarding the customer account information utilizing visual tools. In some embodiments, the visual tools may include pie charts, bar graphs, scatterplots, user graphics, and so on. The smart tables 106 may be configured such that a customer sits while using, or may be configured such that a customer stands while using.

Figure 3:
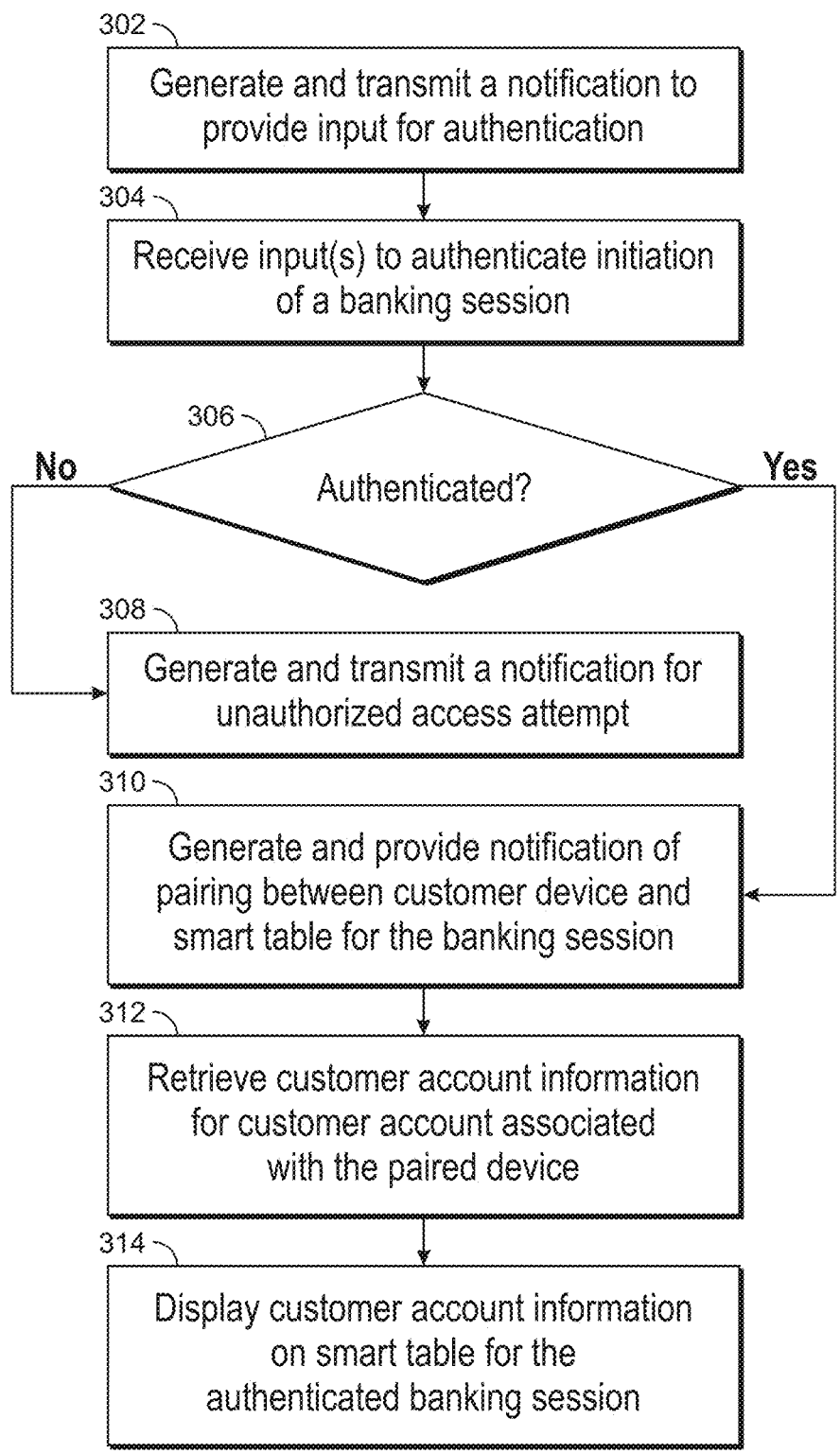
FIG. 3 is a flow diagram of a method for initiating a session with the smart table of FIG. 1, according to example embodiments.

Referring now to FIG. 3, a flow diagram of a method 300 for initiating a session between one or more user devices 104 and a smart table 106 is shown, according to some embodiments. The method 300 may be provided by and/or accessible by the provider client application 120, the branch client application 150, the user client application 132, and the smart table client application 218, for example. The method 300 may be performed by the smart table system 100 described above pertaining to FIGS. 1 and 2. In some embodiments, the method 300 begins in response to receiving, by a smart table 106, a session trigger event. A session trigger event may be any event that triggers the beginning of a session between the smart table 106 and a user device 104. For example, when a customer is within a certain proximity of the smart table 106, the user device 104 associated with the customer that the customer is holding may be within a wireless communication range of various devices (e.g., the branch computing system 108 and/or the smart table 106) associated with the branch location. In response to entering the wireless communication range, the respective user device 104 may be configured to automatically request the customer, via the user device 104, to enter confirmation to establish a secure connection with the smart table 106. As such, the security of the banking session may increase, as a customer may be required to be within a certain proximity of the smart table 106 to begin the banking session. In some embodiments, similarly, a user device 104 of an employee scheduled to be running a banking session for the smart table 106 may also be required to be within proximity of the smart table 106 in order to initiate the banking session. A session trigger event may also include receiving an input via input/output device 220, such as receiving a user interaction via a touch screen display of the smart table 106. In other embodiments, a session trigger event may include a customer or employee logging into a user client application 132 on a user device 104. In additional embodiments, a session trigger event may occur at a specific time, such as in response to the banking session management circuit determining there is a scheduled banking session at a smart table 106 at a specific time. In some embodiments, the smart table 106 may be configured to operate in a low power mode or "sleep mode" until a session trigger event is received.

At 302, the method 300 includes generating and transmitting a notification to a customer device (e.g., a user device 104) to provide an input for authentication. In some embodiments, the notification generation circuit 214 is configured to execute step 302 in response to receiving an instruction from the banking session management circuit 210. The notification generation circuit 214 may be configured to generate a notification requesting user authentication based on information received, via the network 154, from the smart table management circuit 148 and customer account database 118. For example, specific smart tables 106 may require higher levels of authentication before a user may initiate a banking session based on the capabilities of the smart table. Additionally, the customer account database 118 may have stored customer preferences indicating one or more types of input the customer wants to use for authenticating a banking session. Input for authentication may include a personal identification number (PIN), a biometric input (e.g., a fingerprint, a palm print, an eye scan, a voice sample, etc.), an alphanumeric passcode, a barcode, a QR code, a physical key, an electronic key (e.g., a token stored on the user device 104 of the customer), a physical or mobile wallet card (e.g., a credit card with chip technology, a virtual bank card), and so on. In some embodiments, the generated notification may include audible or tactile output when received by the user device 104. For example, in response to receiving the generated notification, the user device 104 may create an audible sound, via the input/output device 134, to catch the attention of the customer and/or an employee working with the customer and/or may cause the user device 104 to vibrate.

In other embodiments, instead of transmitting the notification to a user device 104, the notification requesting an input to authenticate the customer is shown on a display screen of the smart table 106. For example, the notification generation circuit 214 may generate a notification requesting a customer to place a palm on a highlighted area of the display screen of the smart table 106. As another example, the notification generation circuit 214 may provide a notification shown on the display screen of the smart table 106 asking a customer to enter a customer PIN on the customer's user device 104. In some embodiments, the generated notification also includes a message to place the user device 104 associated with the customer on a particular area of the smart table 106. For example, a highlighted area may indicate where to place the user device 104 in order to facilitate using near-field communication data exchange.

The input to authenticate initiation of a banking session is received at step 304. In some embodiments, the authentication circuit 212 is configured to receive the input to authorize initiating the banking session. One or more inputs may be received at step 304, according to some embodiments. For example, in some banking sessions, more than one customer may be detected and/or scheduled to participate in the banking session. As such, the authentication circuit 212 may receive inputs from each customer for the banking session. Additionally, an input to authenticate an employee scheduled to participate in the banking session may also be received at 304. For example, for banking sessions scheduled to conduct transactions with higher security, a branch manager may be required in order to initiate the banking session. As such, authentication inputs may be received from the customer and the branch manager at step 304.

In some embodiments, the inputs are received via the user devices 104 and transmitted to the smart table 106 via the network 154. In other embodiments, the one or more inputs may be received directly by the smart table 106 via the input/output device 220. For example, a PIN for authentication may be entered via a user interface of the customer's user device 104, or a fingerprint may be entered via the input/output device 220 (e.g., a fingerprint scanner) of the smart table 106. Beneficially, a customer may then enter personal authentication information in a more private setting, rather than entering personal authentication information on the smart table 106. As such, the security of the customer's personal information may be improved.

At step 306, the method 300 includes determining whether one or more users are authenticated to initiate the banking session. In some embodiments, the authentication circuit 212 is configured to determine whether authentication for the banking session is successful. The network interface 202 may transmit, via the network 154, the received input to the branch computing system 108 and/or the provider computing system 102. In some embodiments, the provider computing system 102 and/or the branch computing system 108 then determine whether the received input matches user information stored in a database (e.g., in customer account database 118, in employee database 144). For example, the provider computing system 102 determines whether a device token received from the user device 104 matches a token stored in a token vault of the customer account database 118. The network interface 202 may then receive confirmation or a denial of authentication for the one or more users (e.g., a customer, a customer and an employee, more than one customer, etc.). In some embodiments, the authentication circuit 212 is configured to execute step 306 at certain intervals throughout a banking session. For example, after a predetermined time interval, or at the end of a scheduled banking session, the authentication circuit 212 may be configured to re-authenticate the one or more customers and/or employee.

In response to determining one or more of the users were not authenticated, the method 300 proceeds to step 308. The method 300 includes generating and transmitting a notification for an unauthorized access attempt at step 308. In some embodiments, the notification generation circuit 214 is configured to execute the operations at 308. The notification generation circuit 214 may be configured to generate a text notification, an email notification, an automated voiceover notification, and/or any kind of alert to notify a user. The notification generation circuit 214 may be configured to include details concerning the access attempt in the generated notification. For example, the notification may include branch location information (e.g., name, address) and/or a timestamp of when the attempt to initiate a banking session was denied. In some embodiments, the notification also may include contact information for a branch manager and instructions concerning the security of a customer's personal data. For example, the generated notification may include options to view user account details, transaction history, previous banking session history, and so on. The generated notification may also include selectable options to change one or more inputs for authentication (e.g., change a user passcode, change a user PIN, etc.) and/or user preferences (e.g., preferences for increased security before access is granted to customer information). In some embodiments, the notification is transmitted to a user device 104 associated with a customer. The notification may also be transmitted, via the network 154, to a user device 104 associated with a branch manager and/or an employee assigned to a scheduled banking session.

On the other hand, if the authentication circuit 212 determines at step 306 that the one or more users are successfully authenticated, the method 300 proceeds to step 310. At step 310, the method 300 includes generating and providing a notification of a successful pairing between customer device (e.g., user device 104) and the smart table 106 for the banking session. In some embodiments, the notification generation circuit 214 is configured to generate a text alert or email alert indicating the establishment of a secure communication session with the smart table 106. The type of generated notification (e.g., email, text, phone call, etc.) may be based on user preferences. For example, the banking session management circuit 210 may receive session preferences for a customer stored in customer account database 118. The banking session preferences may include the kind of notifications the customer wants to receive. The preferences may also include information on where to direct the generated notification. For example, customer preferences may include contact information (e.g., an email of a parent of the customer, a phone number, etc.) to send the generated notification. As such, in some embodiments, the notification may be provided to one or more user devices 104. The generated notification for a successful pairing between the customer user device 104 and the smart table 106 may also be provided via the input/output device 220 of the smart table 106. For example, the smart table 106 may show the notification on a display screen.

At step 312, the method 300 includes retrieving customer account information for the customer account associated with the pair customer user device 104. In some embodiments, the banking session management circuit 210 is configured to execute step 312. The banking session management circuit 210 may be configured to request, via the network interface 202, customer account information from the provider computing system 102. In some embodiments, the amount of customer account information retrieved is relative to the security of the banking session. For example, the customer account information retrieved is relative to the type of input received for user authentication. As an example, if only a passcode was entered, the customer account information that is retrieved may be more limited than if a passcode and a biometric input were entered to authenticate the customer. In some embodiments, customer account information may include previous banking session history, transaction history for the customer account, balances for various accounts (e.g., savings accounts, checking accounts, credit card accounts), loan information, mortgage information, personal information (e.g., name, address, age, education, occupation, salary, etc.), credit card debt, current investments, retirement plans, savings goals, and so on. The banking session management circuit 210 may also be configured to pull specific documents concerning planned transactions for a scheduled banking session at 312. For example, a prepared document regarding a loan may be retrieved at step 312 for a branch employee to review with the customer during the scheduled banking session.

Once the customer account information has been retrieved, at step 314, the customer account information may be displayed on the smart table 106 for the authenticated banking session. In some embodiments, the customer account information may be displayed in a customer area of a display screen of the smart table 106. In other embodiments, the customer account information may be displayed on the customer's user device 104 rather than on a display screen of the smart table 106. For example, for certain customer account information that is more confidential, such as a social security number, and/or customer account information that a customer indicated in preferences should not be shown during a banking session on a smart table, such as a salary or the customer's overall financial worth, the banking session management circuit 210 may be configured to only provide that information on the customer's user device 104. In some embodiments, the customer account information may be displayed using tables, graphics, and/or other visual tools to help convey the data to the customer in a meaningful manner. For example, concerning retirement, a graphic may show a portion of the customer's current earnings that should be set aside for retirement and the progress the customer has made in saving for retirement over a specific period of time.

Figure 4:
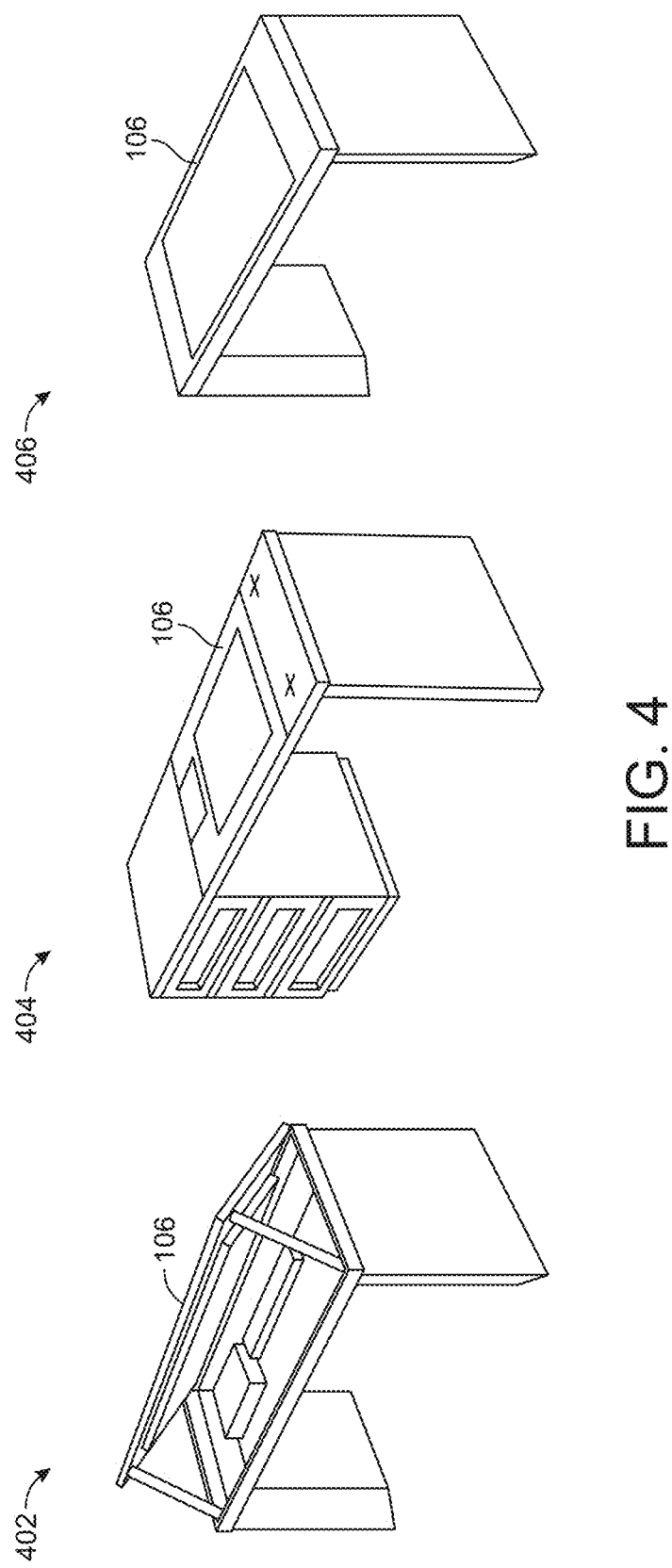
FIG. 4 is an illustration of various configurations of the smart table of FIG. 1, according to example embodiments.

Referring now to FIG. 4, an illustration of various configurations of the smart table 106 are shown, according to some embodiments. A perspective view 402 of a smart table 106 depicts a storage compartment beneath a top surface of the smart table 106. In some embodiments, the cash dispenser of the smart table 106 may be accessed by lifting a top surface of the smart table 106. As such, the cash dispenser may easily be serviced by lifting the top surface of the smart table 106, covering the storage compartment. In other embodiments, a storage compartment of the smart table 106 may be accessed by sliding the top surface to a side of the smart table 106, rather than lifting the top surface. A perspective view 404 of a smart table 106 shows an integration of storage compartments for the smart table 106 and a digitally enabled, touch screen display, according to some embodiments. A perspective view 406 of a smart table 106 depicts a touch screen display encompassing the top surface of the smart table 106. In some embodiments, the smart table 106 may not include a cash dispenser, as shown in perspective view 406. The views shown in FIG. 4 are meant to be illustrative in purpose only, and should not be regarded as limiting in any manner.

Figure 5:
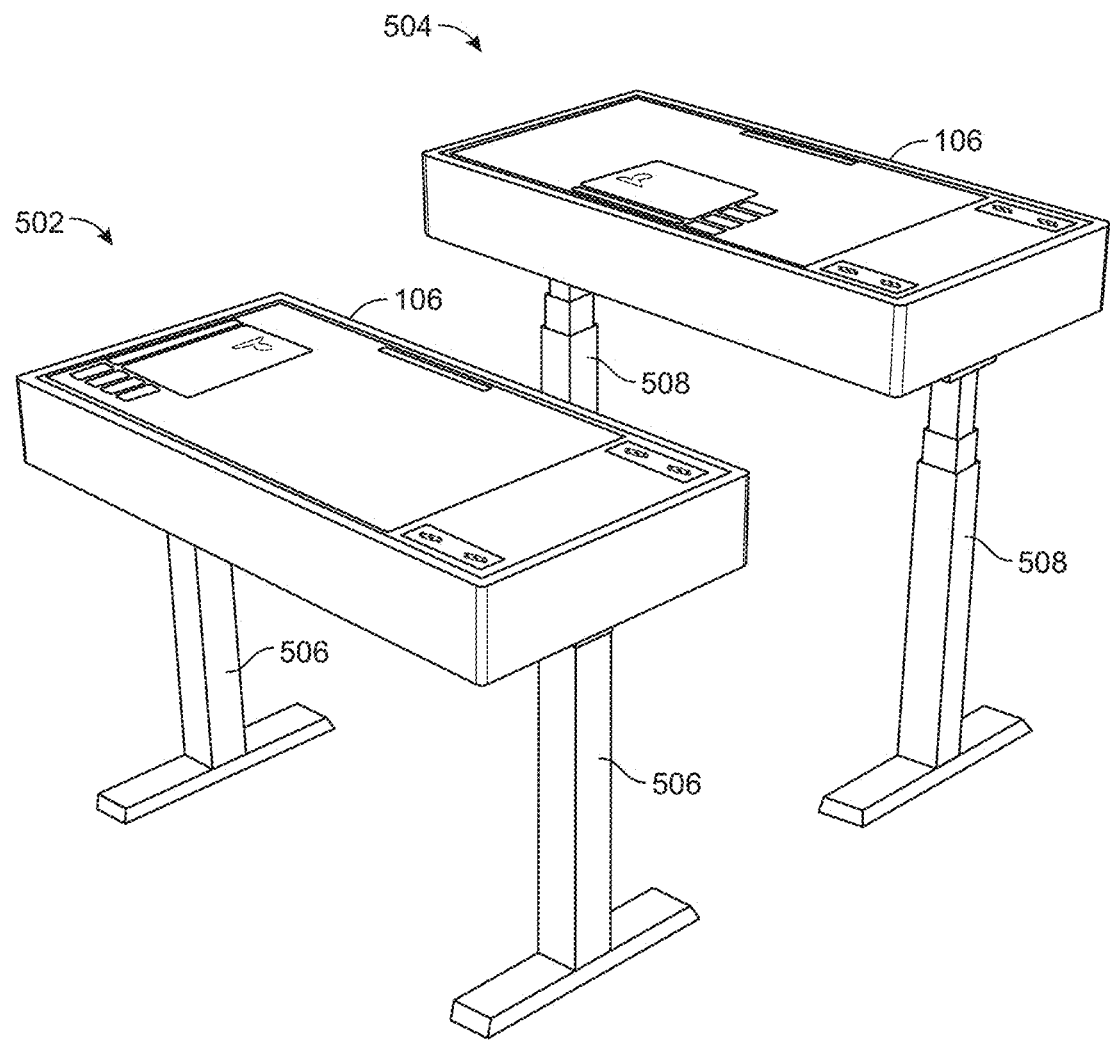
FIG. 5 is an illustration of additional configurations of the smart table of FIG. 1, according to example embodiments.

Referring now to FIG. 5, an illustration of additional configurations of the smart table is shown, according to some embodiments. Perspective view 502 depicts a smart table 106 with a touch screen display and legs 506 at a set height. Perspective view 504 shows a smart table 106 including a touch screen display and legs 508. In some embodiments, the legs 508 may be adjusted to varying heights based on user preference. For example, a user may increase or decrease the height of the smart table 106 by operating motorized lifting columns to increase or decrease the height of the legs 508. In some embodiments, the motorized lifting columns of the legs 508 are activated using a switch on the smart table 106. In other embodiments, the height of the smart table 106 is increased or decreased by entering an input via a touch screen of the smart table 106.

Figure 6:
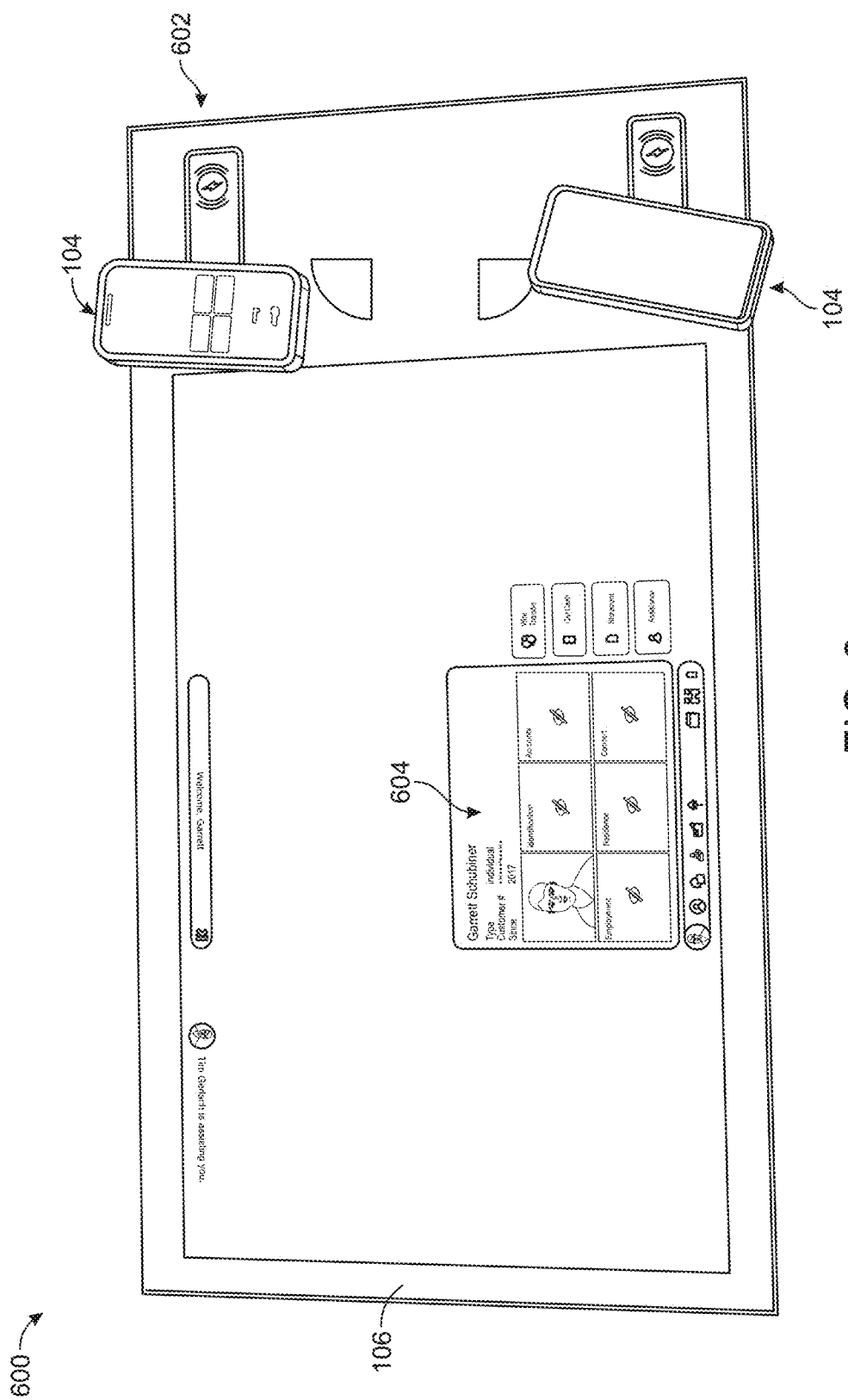
FIG. 6 is an illustration of a user interface of the smart table and paired user devices of FIG. 1, according to example embodiments.

Referring now to FIG. 6, an illustration of a user interface 600 of the smart table 106 and paired user devices 104 is shown, according to some embodiments. The user interface 600 may be provided by the smart table client application 218. In some embodiments, the user interface 600 is generated and displayed, via an input/output device 220, by the banking session management circuit 210. The user interface 600 includes account summary window 604, for example. The account summary window 604 may include a name, address, photo identification, and contact information for a customer. In some embodiments, the account summary window 604 is displayed in response to receiving a selection of a profile icon on the user interface 600. The user interface 600 also includes a device area 602. In some embodiments, the device area 602 includes a charging icon and a wireless connection icon. The connection icon may indicate to one or more users (e.g., a customer, two customers, a customer and an employee, etc.) where to place a user device 104 in order to pair to the smart table 106. As such, the connection icons shown on the user interface 600 may be used as indicators of the locations of NFC tags within the smart table 106. In some embodiments, the user interface 600 may utilize different colors to indicate a successful pairing and an unsuccessful pairing in device area 602. For example, the connection icon may turn green in response to a successful pairing to the respective user device 104 placed over the connection icon. Although FIG. 6 depicts two user devices 104, the smart table 106 may be configured to pair to more than two different user devices 104, according to some embodiments.

Figure 7:
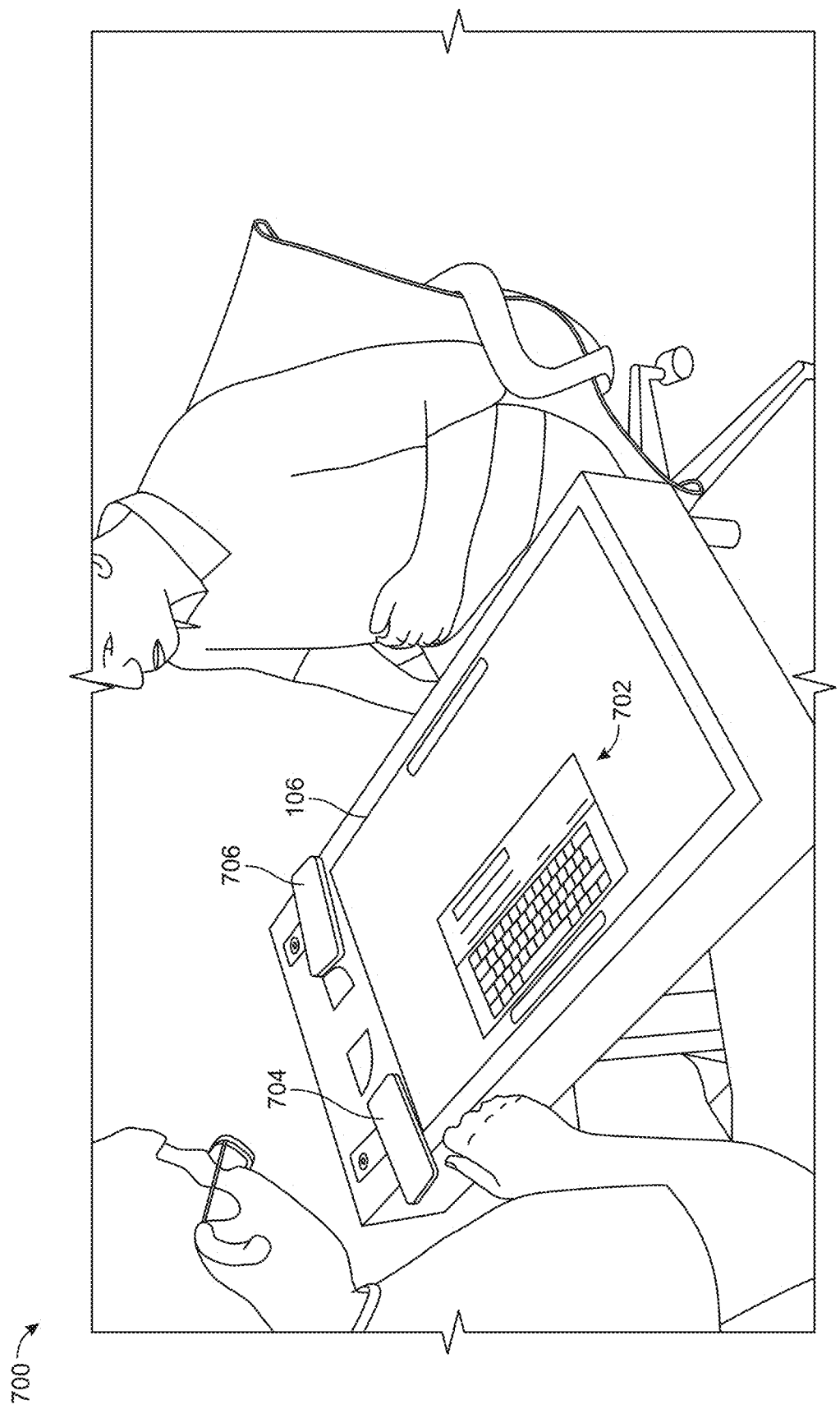
FIG. 7 is an illustration of a user interface of the smart table of FIG. 1 configured to receive an input from a customer or provider representative, according to example embodiments.

Referring now to FIG. 7, an illustration 700 of a user interface of the smart table 106 configured to receive an input from a customer or provider representative is shown, according to some embodiments. The illustration 700 depicts a keyboard 702, a customer device 704, and an employee device 706. The customer device 704 and the employee device 706 may both be the same or similar as the user devices 104 described above. In some embodiments, the keyboard 702 is displayed on a user interface of the smart table 106 to provide an input for the customer. The keyboard 702 may be displayed to enter new information, such as a change of address for the customer. In some embodiments, the keyboard 702 is oriented on a display screen of the smart table 106 based on whether a customer or an employee needs to enter information. For example, the smart table 106 may serve as a desk for a branch employee (e.g., a banker). As such, while sitting down at the smart table 106, the customer and the branch employee may be seated on opposite sides of the smart table 106. In some embodiments, the input/output device 220 of the smart table 106 is configured to determine an orientation and position for the keyboard 702 based on data received from sensors and/or cameras of the smart table 106.

Figure 8:
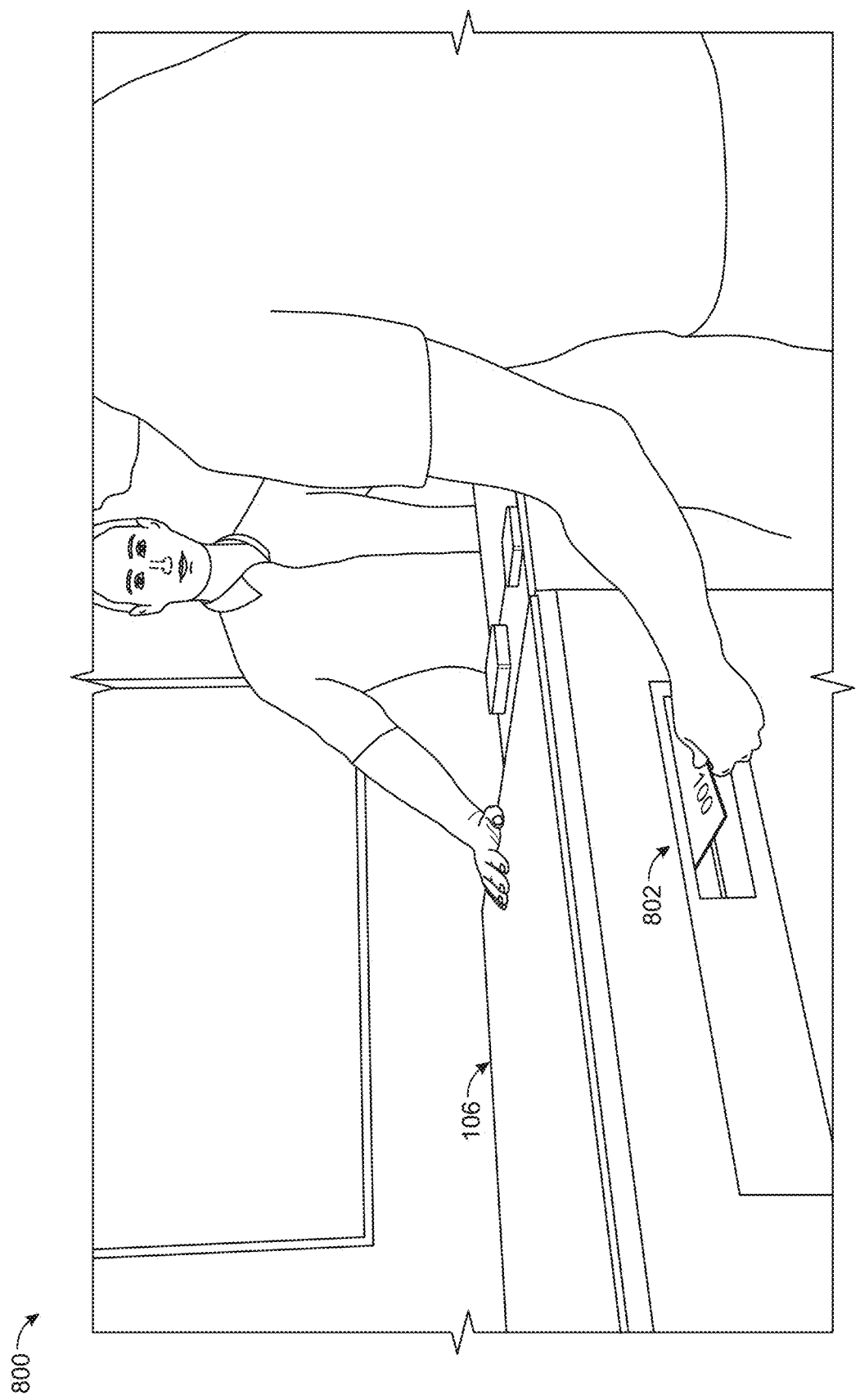
FIG. 8 is an illustration of the smart table of FIG. 1 including a dispensing mechanism, according to example embodiments.

Referring now to FIG. 8, an illustration 800 of the smart table 106 including a dispensing mechanism 802 is shown, according to some embodiments. The dispensing mechanism 802 can be a cash dispenser, though it will be appreciated that the dispensing mechanism 802 can be configured to dispense any type of item, such as cash, a receipt, checks, stamps, and so on. Accordingly, the smart table 106 may beneficially be utilized as an automated teller machine (ATM). In some embodiments, the smart table 106 may be used as an assisted-service ATM, as shown in FIG. 7. The smart table 106 may also function as a station for tellers at a branch location. In other embodiments, the smart table 106 may be used as a self-service ATM, without using employees to supervise the transaction at the smart table 106. The smart table 106 may be configured to pair with the user device 104 of the customer before dispensing cash via the dispensing mechanism 802. For example, the dispenser management circuit 216 is configured to receive approval from the authentication circuit 212 before providing cash to a customer using the smart table 106.

Figure 9:
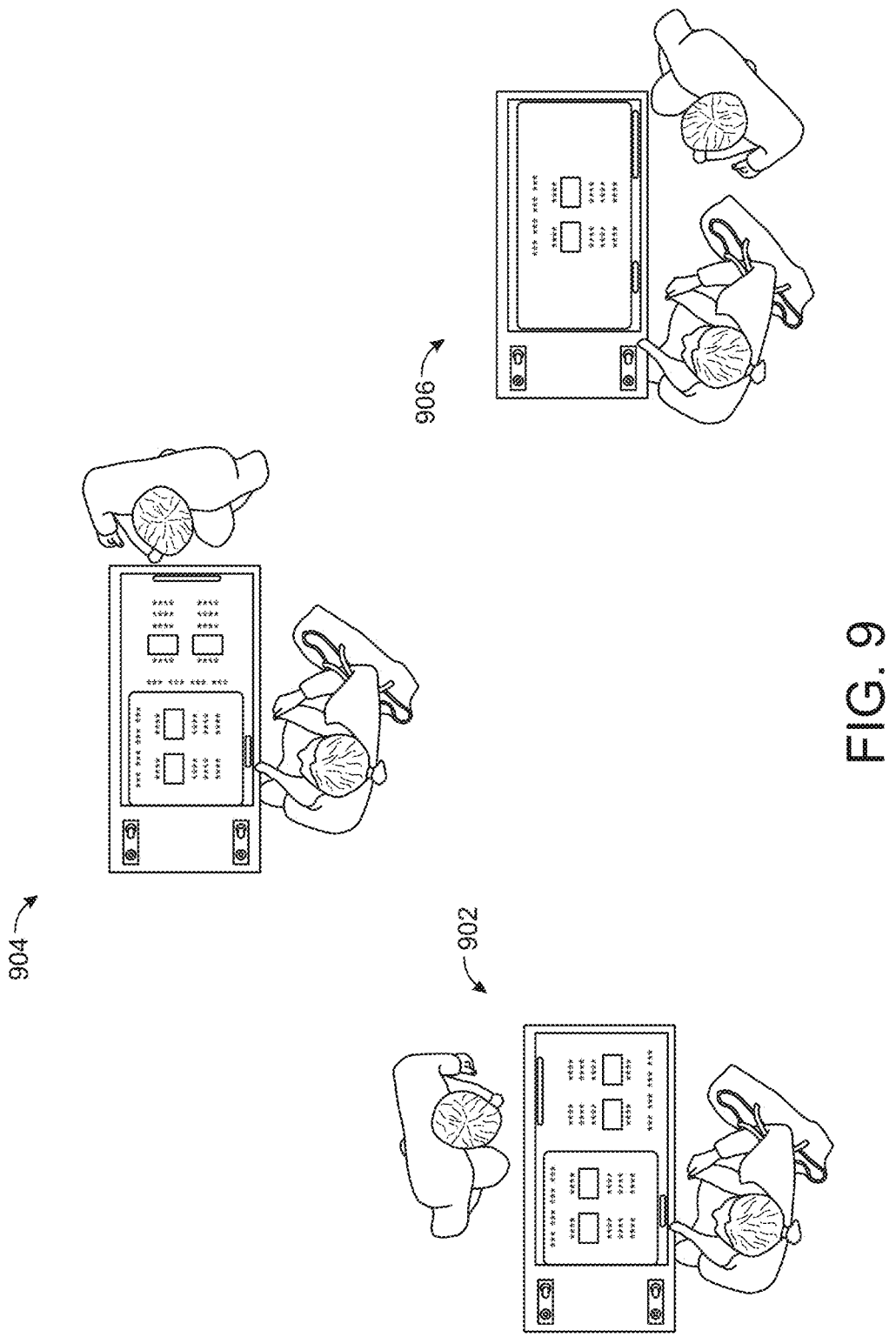
FIG. 9 is an illustration of various user interface orientations displayable by the smart table of FIG. 1, according to example embodiments.

Referring now to FIG. 9, an illustration 902 of various user interface orientations displayable by the smart table 106 is shown, according to some embodiments. A first user interface orientation 902 includes a user interface of a smart table 106 with half of a customer interface area and half of a branch employee interface area. In some embodiments, the branch employee interface area is rotated 180 degrees from the customer interface area in a traditional setting for when the branch employee is on an opposite side of the smart table 106 from the customer. A second user interface orientation 904 includes a user interface of the smart table 106 with the customer interface area and the branch employee interface area rotated 90 degrees from the customer interface area for a more casual setting. A third user interface orientation 906 includes a user interface of the smart table 106 with one interface area for both the customer and the branch employee. In some embodiments, the third user interface orientation 906 shows the customer interface area for when the customer and the branch employee are on the same side of the smart table 106, for example.

Figure 10:
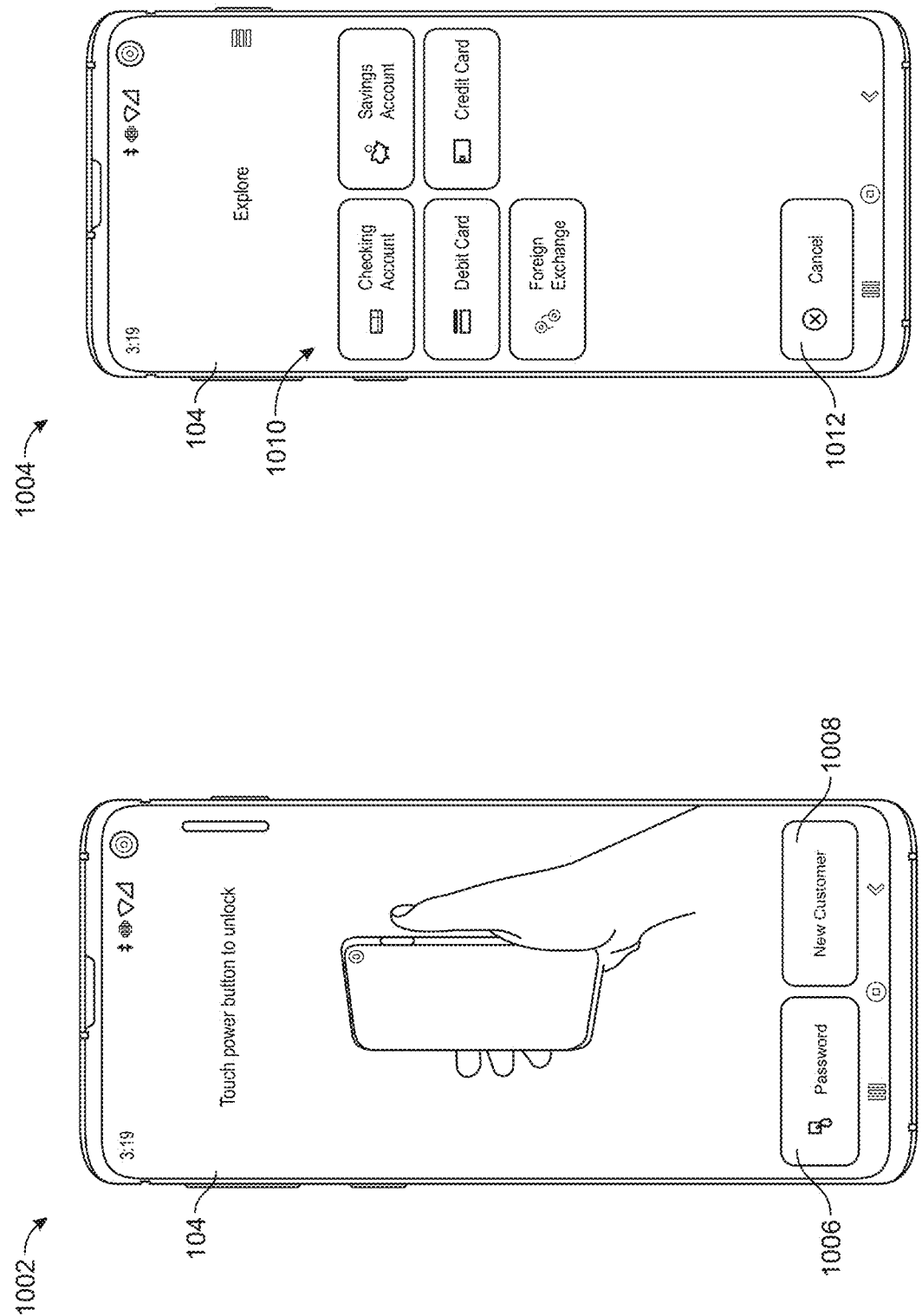
FIG. 10 is an illustration of example user interfaces of the user device of FIG. 1 when the user device is paired to the smart table of FIG. 1, according to example embodiments.

Referring now to FIG. 10, an illustration of example user interfaces of the user device 104 when the user device 104 is paired to the smart table 106 is shown, according to some embodiments. FIG. 10 includes user interface 1002 and user interface 1004. In various embodiments, the user interface 1002 and the user interface 1004 are generated by the smart table system 100 described above with reference to FIG. 1. In some embodiments, the user interface 1002 and the user interface 1004 are generated during the method 300 described above with reference to FIG. 3. The user interface 1002 may be displayed on a user device 104 associated with a customer attempting to pair to a smart table 106, for example. The user interface 1002 may include activatable icons for selecting various options regarding authenticating the customer. In some embodiments, the user interface 1002 includes a password activatable icon 1006 and a new customer activatable icon 1008. In response to receiving a user selection of the password activatable icon 1006, a prompt, generated by the notification generation circuit 214, to enter a password for customer authentication may be displayed. Upon selection of the new customer activatable icon 1008, the notification generation circuit 214 may generate and display a new user interface requesting the user to fill out information to create an account (e.g., a bank account associated with the provider).

The user interface 1004 may be displayed on the user device 104 in response to successful authentication and pairing with the smart table 106. In some embodiments, the user interface 1004 includes activatable icons list 1010 for selecting various options regarding accounts of the customer. For example, the activatable icons list 1010 may include options to view information pertaining to a checking account, a savings account, a debit card, a credit card, and/or foreign exchange. The user interface 1004 may also include a cancel activatable option 1012. In some embodiments, in response to selection of the cancel activatable option 1012, the banking session ends and the established connection between the smart table 106 and the one or more paired user devices 104 ends. In some embodiments, the user device 104 may return to a home page of the user client application 132 in response to receiving a selection of the cancel activatable option 1012.

The terms selectable and activatable are used interchangeably herein. Selectable/activatable icons presented as part of example GUIs may cause a signal to be generated upon selection/activation. The signal may be transmitted to a system, device, or application to indicate to the device, system, or application which icon has been selected, and the device, system, or application may respond accordingly.

Figure 11:
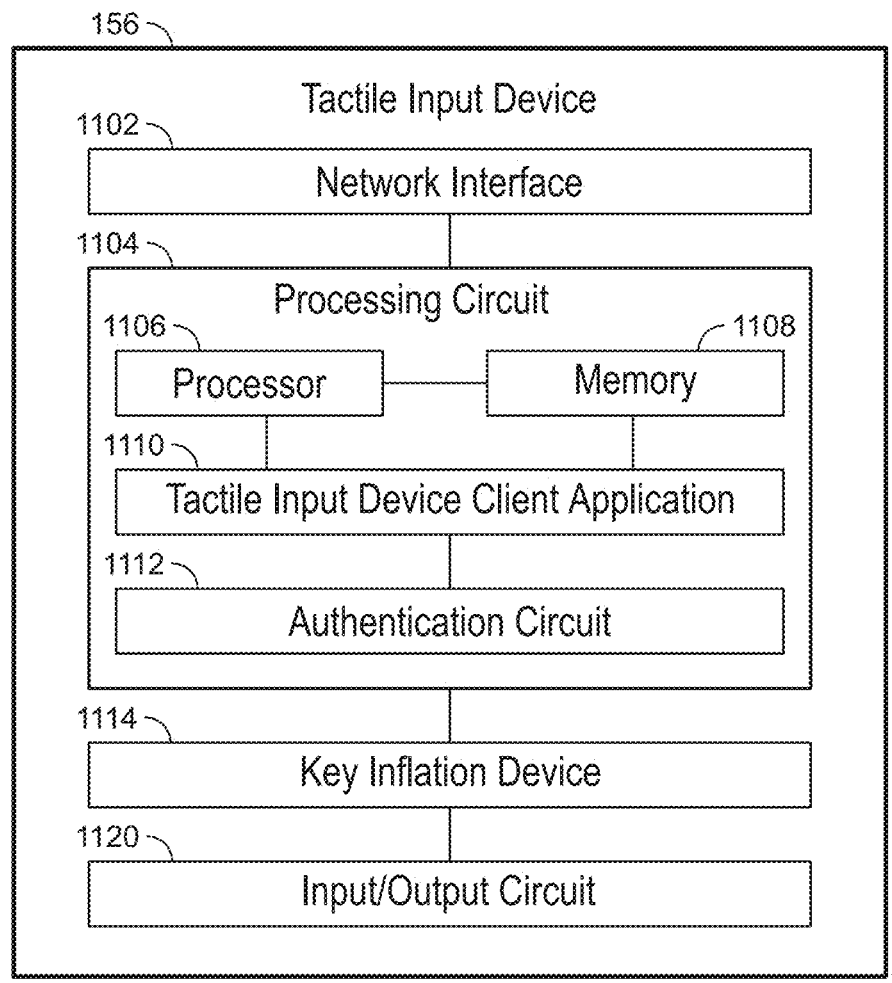
FIG. 11 is a block diagram of the tactile input device of FIG. 1, according to example embodiments.

Referring now to FIG. 11, a block diagram of the tactile input devices 156 is shown, according to some embodiments. As illustrated, each of the tactile input devices 156 may include a network interface 1102, a processing circuit 1104, and an input/output circuit 1120 as well as a key inflation device 1114. The network interface 1102 and the processing circuit 1104 may function substantially similar to and include the same or similar components as the network interface 110 and the processing circuit 112 described above, with reference to the provider computing system 102. Thus, it should be understood that the description of the network interface 110 and the processing circuit 112 of the provider computing system 102, provided above, may be similarly applied to the network interface 1102 and the processing circuit 1104 of each of the tactile input devices 156.

For example, the network interface 1102 is similarly structured and used to establish connections with other computing systems (e.g., the provider computing system 102, the branch computing system 108) via the network 154. The network interface 1102 may further include any or all of the components discussed above, with reference to network interface 110. Further, the network interface 1102 may also be structured and used to establish a connection between the tactile input devices 156 and the smart table 106. For example, in some instances, the network interface 110 may be configured to provide communication between the tactile input devices 156 and the smart table via a Bluetooth™, Wi-Fi™, and/or a near-field communication (NFC) connection.

The processing circuit 1104 similarly includes a processor 1106 and a memory 1108. The processor 1106 and the memory 1108 are substantially similar to the processor 114 and the memory 116 described above. As such, the tactile input devices 156 are similarly configured to run a variety of application programs and store associated in a database of the memory 1108. For example, the tactile input devices 156 may be configured to run the tactile input device client application 1110.

The processing circuit 1104 may also include an authentication circuit 1112 for example. In other embodiments, the processing circuit 1104 may contain more or less components than shown in FIG. 11. The components of FIG. 11 are meant for illustrative purposes only, and should not be regarded as limiting in any manner.

The input/output circuit 1120 of each tactile input device 156 may function substantially similar to and include the same or similar components as the input/output device 220 described above, with reference to the smart table 106. Accordingly, it should be understood that the description of the input/output device 220 provided above may also be applied to the input/output circuit 1120 of each of the tactile input devices 156.

For example, the input/output circuit 1120 of each tactile input device 156 is similarly structured to receive communications from and provide communications to customers and one or more branch employees associated with each tactile input device 156. In some embodiments, the input/output circuit 1120 may include a biometric scanner that is configured to recognize various biometric identifiers (e.g., finger/thumb prints, facial recognition, voice recognition). In further embodiments, the input/output circuit 1120 may comprise a scale-type device that is structured to measure the weight of an item on the surface of the tactile input device 156. For example, in one embodiment, the tactile input device 156 may be used to determine the weight of a safety deposit box placed on the surface of the tactile input device 156.

In some instances, the tactile input device client application 1110 may have many of the same capabilities of the smart table client application 218. For example, the tactile input device client application 1110 may be configured to communicate with the provider computing system 102, the branch computing system 108, and smart table 106 to receive instructions and reminders from the provider computing system 102, the branch computing system 104, and/or the smart table 106 for the branch employees associated with each tactile input device 156 to perform various tasks associated with a banking session. Accordingly, the tactile input devices 156 may be communicably coupled to the provider computing system 102 (e.g., through interactions with the provider client application 120), and the branch computing system 108 (e.g., through interactions with the branch client application 150. Further, the tactile input device client application 1110 may also be communicably coupled to the smart table 106 (e.g., through interactions with the smart table client application 218).

The authentication circuit 1112 may be configured to determine whether a user is authenticated to initiate a banking session and/or to complete certain financial tasks. For example, the authentication circuit 1112 may be configured to receive a PIN or a biometric input from a user (e.g., a bank employee or a customer). The authentication circuit 1112 may then be configured to request an authorization approval from the provider computing system 102 based on the received PIN or biometric input. In some instances, the authentication circuit 1112 may be configured to generate an authentication score for a user is during a banking session. For example, a user that enters both a biometric input and an alphanumeric passcode may receive a first authentication score of 100%. Conversely, a user that only enters a PIN may receive a second authentication score of 50%.

The key inflation device 1114 may be configured to receive configuration information from the tactile input device client application 1110 based on a necessary configuration for a given action. Depending on the configuration information received from the tactile input device client application 1110, the key inflation device 1114 is configured to selectively inflate various areas of the tactile input device 156 to provide various tactile input layouts. For example, in some instances, the tactile input layouts may include a QWERTY keyboard layout, a 10-key keyboard layout, an authorization layout, a signature box layout, a weight measurement layout, and/or any other necessary layout for a given action.

Figure 13:
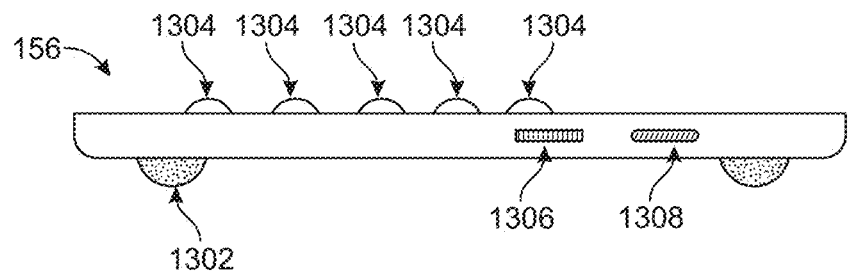
FIG. 13 is an illustration of a side view of the tactile input device, according to example embodiments.

In some embodiments, the key inflation device 1114 may include a dial configured to change the pressure within various input areas on the surface of the tactile input device 156 and a device configured to route inflation fluid to the correct input areas to form the necessary tactile inputs (e.g., the inflatable keys 1304, shown in FIG. 13). In other embodiments, the input areas may be inflated by a pump configured to selectively pressurize a hydraulic circuit having selectively actuatable valves configured to route the inflation fluid to the correct input areas. In other embodiments, the input areas may be inflated using various other suitable hydraulic, mechanical, and/or electromechanical methods, as deemed appropriate for a given application. In some embodiments, various layouts are attained by inflating separate layers of an overlay. In other embodiments, the key inflation device 1114 may determine individual input areas (e.g., keys or buttons) to inflate that would produce the desired layout for a given application.

In one embodiment, a banking session may take place at a smart table 106, but may require authorization by a supervisor of the branch employee. In this instance, the banking session may be continued on the tactile input device 156, which may be physically taken to the supervisor for authorization. Upon authorization, the tactile input device 156 may then be returned to the smart table 106 where the banking session may then resume.

In another embodiment, the tactile input device client application 1110 may receive a required tactile layout from the smart table 106. In this instance, the tactile input device client application 1110 may then communicate the required tactile layout to the key inflation device 1114. For example, the smart table client application 218 may indicate that an alphanumeric input is required, prompting an alphanumeric input determination. The smart table client application 218 may then communicate the necessary input to the tactile input client application 1110, which then relays a particular key inflation layout to the key inflation device 1114.

The use of the tactile input device 156 with the smart table system 100 may beneficially reduce significant amounts of time to complete financial transactions during a banking session and/or fill out paperwork forms. For example, the user may be able to input information more quickly and more easily check for mistakes in the entry. This is due to the ability of the user to enter information without needing to look where they are typing as the location of the hands of the user is able to be referenced by the keys (e.g., similar to using a standard keyboard). Furthermore, the tactile input device 156 may improve banking sessions by making the input device more dynamic and able to start a banking session, or authorize a banking session remotely. For example, a customer may be able to enter general banking session information (e.g., name, desired transaction) prior to an appointment at the smart table 106, where the information entered on the tactile input device 156 is able to be automatically transferred to the smart table 106.

Figure 12:
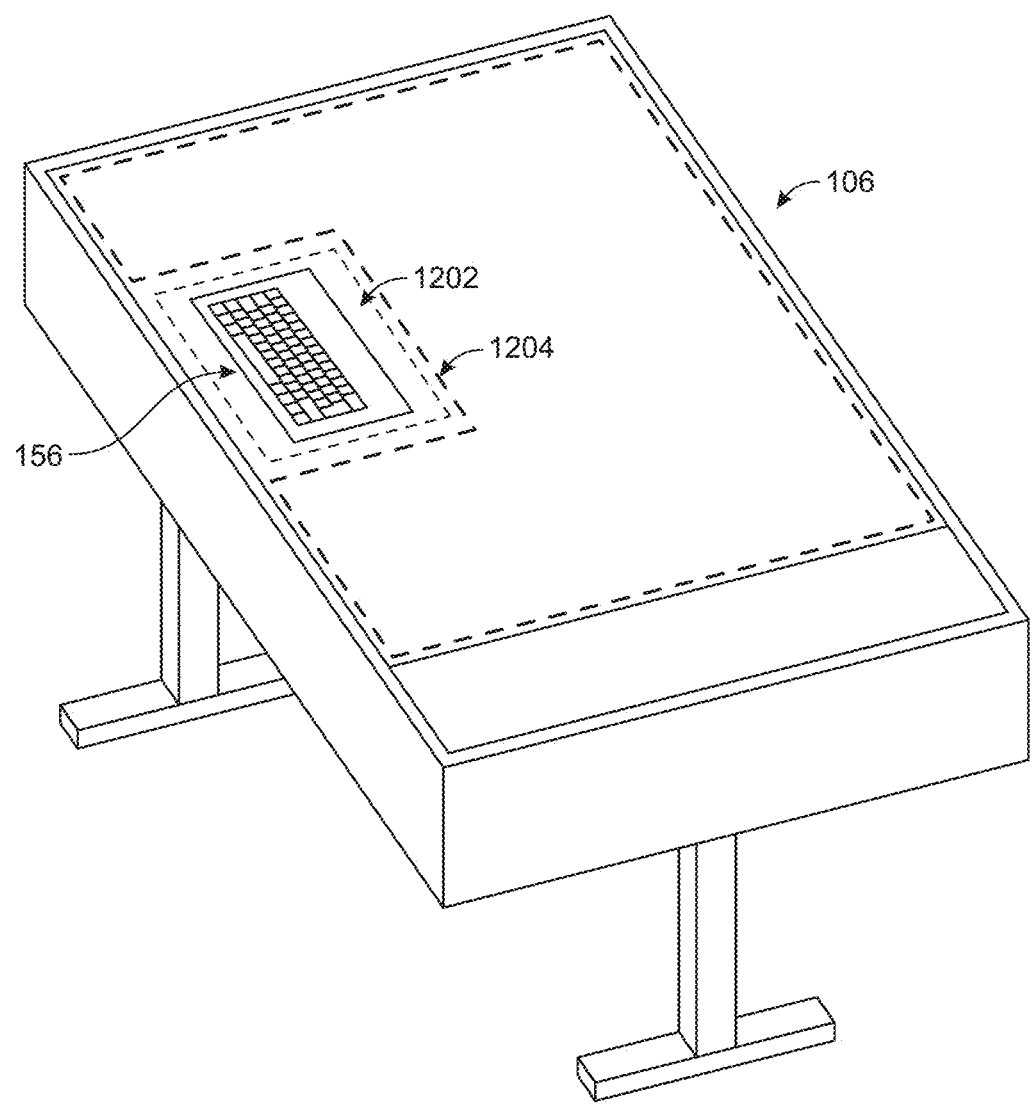
FIG. 12 is an illustration of a tactile input device on the smart table of FIG. 1, according to example embodiments.

Referring now to FIG. 12, an illustration of a tactile input device 156 on the smart table 106 is shown, according to some embodiments. In some embodiments, the smart table 106 senses the placement of the tactile input device 156 on the surface of the smart table 106. For example, the smart table 106 may determine the location of the tactile input device 156 and rearrange the layout of the user interface of the smart table 106 to include a tactile input device area 1202 and an unobstructed area 1204. The tactile input device area 1202 may be the area of the user interface on the smart table 106 where the tactile input device 156 is placed on the smart table 106. The unobstructed area 1204 may be the area of the user interface on the smart table 106 that is unobstructed by the tactile input device 156 (e.g., where the tactile input device 156 is not covering the surface of the smart table 106). In some embodiments, the tactile input device 156 may include a touch screen. In these instances, the tactile input device 156 may be configured to prompt the smart table 106 to not display anything within the tactile input device area 1202 underneath the tactile input device 156. In other embodiments, the tactile input device 156 may alternatively be configured to utilize the touch screen of the smart table 106. For example, the tactile input device 156 may be sufficiently flexible and/or heat transmitting to allow for a user's touch to be conducted there through onto the touchscreen of the smart table 106. In these embodiments, the smart table 106 may display an appropriate layout underneath the tactile input device 156 within the tactile input device area 1202, such that various touch screen keys or buttons are aligned with the input areas (e.g., keys or buttons) formed by the key inflation device 1114. In some instances, the tactile input device 156 may include a transparent touch screen configured to detect user inputs and transmit the user inputs to the smart table 106. In these instances, although the tactile input device is not utilizing the touch screen of the smart table 106, the smart table 106 may still display the appropriate layout underneath the tactile input device 156 to show the user the appropriate layout for entering information through the transparent touch screen of the tactile input device 156.

Referring now to FIG. 13, an illustration of a side view of a tactile input device 156 is shown, according to an example embodiment. In some embodiments, the tactile input device 156 has pads 1302. In some instances, the pads 1302 may be arranged at the four corners on the base. In other instances, the pads 1302 may be arranged in other orientations. In some embodiments these pads are conductive and can communicate to the smart table 106 the position of the tactile input device 156. In further embodiments, the pads 1302 may be used to measure the weight of a safety deposit box. The pads 1302 may contain a strain gauge load cell to determine said weight of the safety deposit box. In some embodiments, such as when the tactile input device 156 is configured to conduct the user's touch there through onto the touchscreen of the smart table 106, the tactile input device 156 may not include the pads 1302. In some embodiments, inflatable keys 1304 (e.g., formed by the key inflation device 1114) may be rounded, as shown in FIG. 13. In other embodiments the inflatable keys 1304 may form various other another shape (e.g., crescent, v-shaped).

In some embodiments, the tactile input device 156 may have a dial 1306 to adjust the pressure in the inflatable keys 1304. In further embodiments, the pressure adjustment can be performed using various other mechanical and/or electromechanical methods (e.g., slider, increase/decrease buttons). The tactile input device 156 may also include a power button 1308. In further embodiments the overlay of the tactile input device 156 may have an anti-microbial surface (e.g., anti-microbial additives). In further embodiments, the display of the tactile input device 156 may have the ability to heat to a temperature to kill bacteria on the surface. In another embodiment, the display may be configured to display ultraviolet (UV) light that works to kill viruses on the tactile input device 156.

Figure 14:
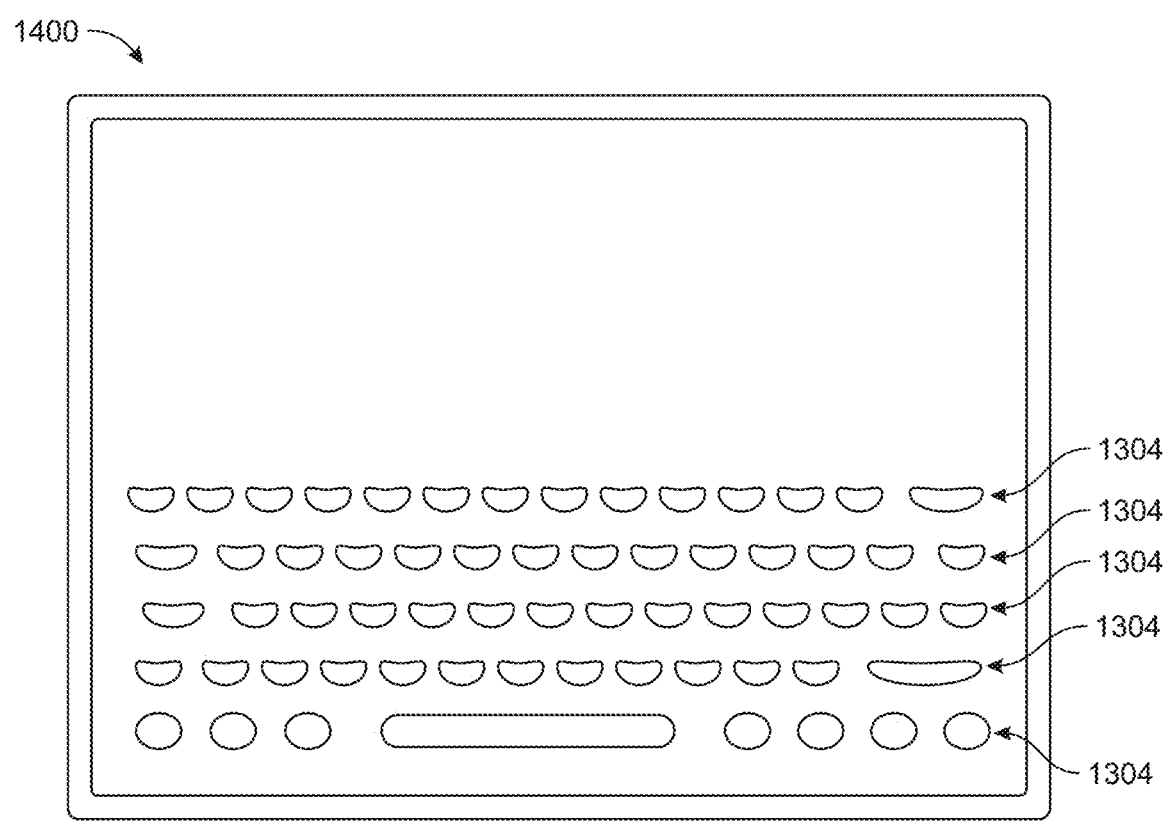
FIG. 14 is an illustration of the tactile input device configured in a QWERTY keyboard layout, according to example embodiments.

Referring now to FIG. 14, an illustration of a tactile user interface of the tactile input device 156 is shown configured in an alphanumeric keyboard layout 1400, according to an example embodiment. In some embodiments, alphanumeric entries may be required for various given actions performed by the smart table 106. Accordingly, the keyboard layout 1400 may be used in these instances where letters and/or numbers are required (e.g., personal information, account information). As illustrated, the keyboard layout 1400 may be provided as a QWERTY keyboard layout. In some other instances, the keyboard layout 1400 may be provided as various other types of keyboard layouts (e.g., Colemak, AZERTY, Dvorak, Neo, or any other suitable type of keyboard layout). As illustrated, in some instances, the inflatable keys 1304 may be provided in a crescent shape. As discussed above, the inflatable keys 1304 may be provided in various other shapes.

Figure 15:
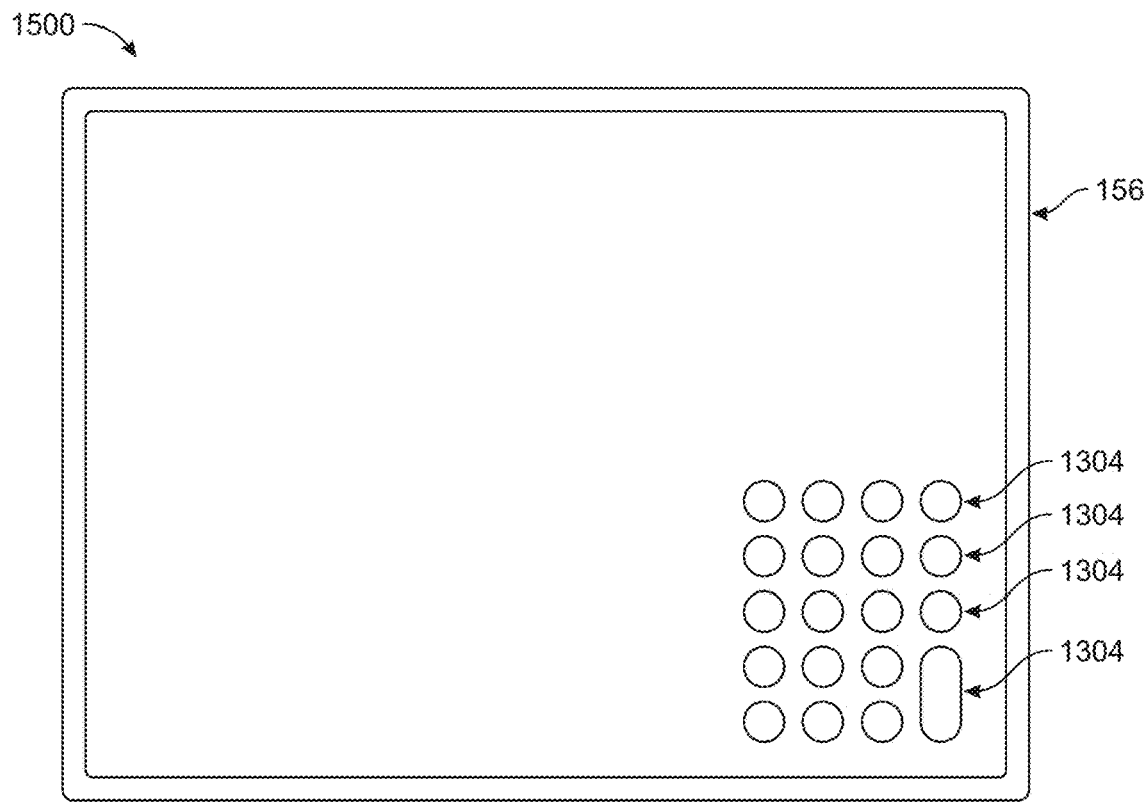
FIG. 15 is an illustration of the tactile input device configured in a numeric keypad layout, according to example embodiments.

Referring now to FIG. 15, an illustration of a tactile user interface of the tactile input device 156 configured in a numeric keypad layout 1500 is shown, according to an example embodiment. In some embodiments, numeric and mathematical entries may be required (e.g., entering monetary values, summing deposits) for various given actions performed by the smart table 106. Accordingly, the numeric keypad layout 1500 may be used in these instances to allow for these necessary entries. As illustrated, the inflatable keys 1304 may be provided in the lower right corner. In other embodiments, the inflatable keys 1304 could be provided on the left, centered, or located in another location, as deemed appropriate for a given application. In further embodiments, the tactile input device 156 may be a different size. For example, the tactile input device 156 may be sized depending on an intended layout for the tactile input device. For example, in some instances, the tactile input device 156 may be sized to more accurately fit the numeric keypad layout 1500. In other instances, the tactile input device 156 may be sized to fit various other layouts described herein.

Figure 16:
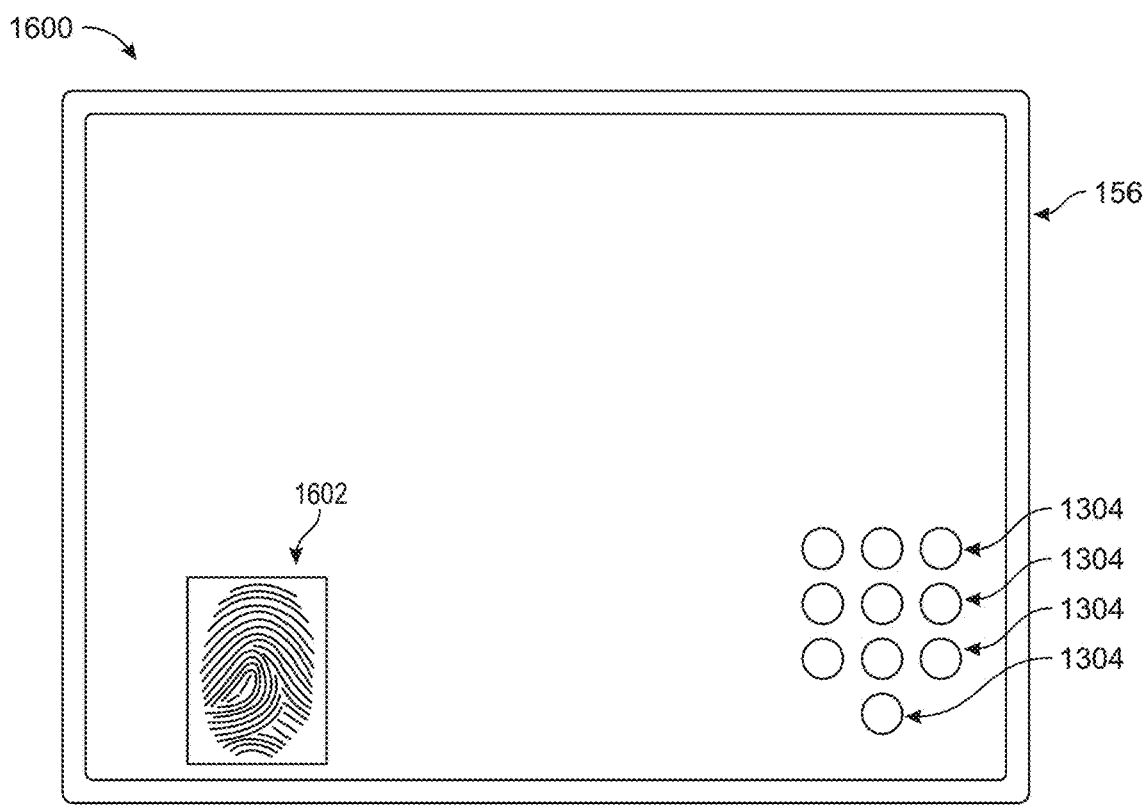
FIG. 16 is an illustration of the tactile input device configured in an authorization layout, according to example embodiments.

Referring now to FIG. 16, an illustration of a tactile user interface of the tactile input device 156 configured in an authentication layout 1600 is shown, according to an example embodiment. In some embodiments, the employee and/or the customer may be required to authenticate their identities for various given actions performed by the smart table 106. In some instances, the smart table 106 may utilize the tactile input device 156 to perform various authentication activities. Accordingly, in these instances, the tactile input device 156 may provide the authentication layout 1600. The authentication layout 1600 may allow for the input of both biometric data (e.g., thumb scan) via a biometric sample area 1602 and a personal identification number (PIN) on a 10-key PIN arrangement of inflatable keys 1304.

In some embodiments, the tactile input device 156 allows for an encrypted separation between the tactile input device 156 and the smart table 106. For example, the PIN may be encrypted and sent to the smart table 106 where it is decrypted. For example, the entering of the PIN may need to be payment card industry (PCI) compliant. In these instances, the tactile input device 106 may allow for compliance with the PCI data security standards. In further embodiments, the tactile input device 156 may be a different size. For example, the tactile input device 156 may be sized to more exactly fit the authentication layout 1600.

Figure 17:
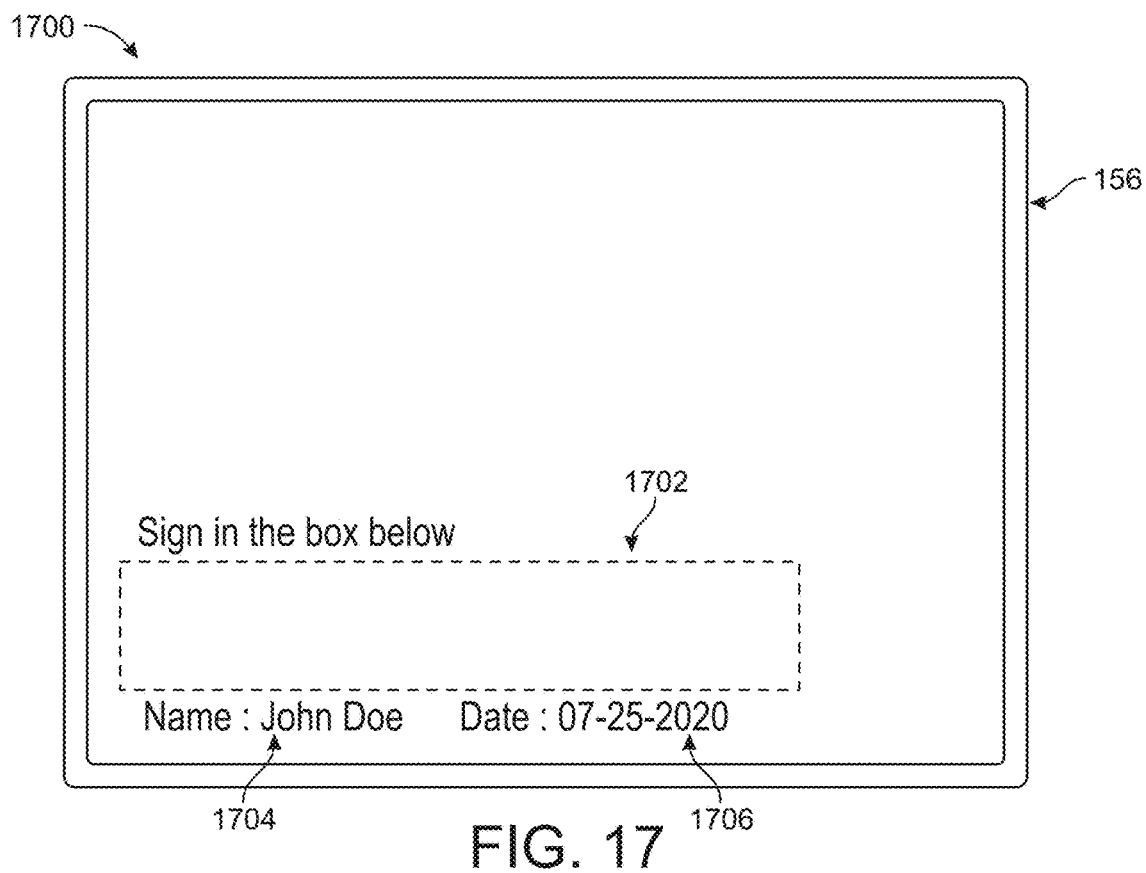
FIG. 17 is an illustration of the tactile input device configured in a signature box layout, according to example embodiments.

Referring now to FIG. 17, an illustration of the tactile input device 156 configured in a signature layout 1700 is shown, according to an example embodiment. In some embodiments, the smart table 106 may require the signature of a branch employee or customer. The tactile input device 156 may show a user interface of a signature box 1702, with the signee's name 1704 and the date of signature 1706. In some embodiments, the user may sign the screen of the tactile input device utilizing a stylus or a finger. In these instances, the tactile input device 156 may be configured to scan the finger of the user for biometric data, as a form of authentication. In some embodiments, a camera or series of cameras above the smart table 106 may be activated to record the customer signing. This may function as a multimedia way of capturing consent.

In some embodiments, the smart table may require multiple signatures from multiple signees. In these instances, the tactile input device 156 may generate multiple signature boxes 1702. In further embodiments, the tactile input device 156 may be a different size. For example, the tactile input device 156 may be sized to more exactly fit the signature layout 1700

Figure 18:
FIG. 18 is an illustration of the tactile input device configured to measure the weight of a safety deposit box, according to an example embodiment.

Referring now to FIG. 18, an illustration of the tactile input device 156 configured in a scale layout 1800 is shown, according to an example embodiment. In some instances, the tactile input device 156 may be configured to measure the weight of an item (e.g., a safety deposit box, a watch, currency). In these instances, the tactile input device 156 may be arranged in the scale layout 1800. The tactile input device 156 may use a strain gauge load cell in the body of the tactile input device 156 or the pads 1302 to measure the weight of an item. It should be appreciated that this is only one of a number of other ways the tactile input device may measure the weight of an item. In some embodiments, the tactile input device 156 may warn the user to place the tactile input device 156 on the floor or separate table prior to weighing the safety deposit box. In further embodiments, the branch employee may be prompted by the tactile input device 156 to place a safety deposit box or other item on the top surface to measure the weight.

It should be appreciated that, in some cases, the tactile input device 156 may be sized according to the intended interface layout (e.g., keyboard layout 1400 the various interface layouts be provided that is smaller than the depicted tactile input device 156, such that the numeric inflated keys of the numeric keypad layout 1500 substantially fill the surface of the tactile input device 156. Accordingly, by providing a smaller tactile input device 156, the tactile input device 156 may cover a smaller portion of the smart table 106, thereby allowing for the unobstructed area 1204 to be larger. By providing a larger unobstructed area 1204, the smart table 106 may have additional room within which to provide various information and/or graphics to the user via the interface of the smart table 106.

Figure 19:
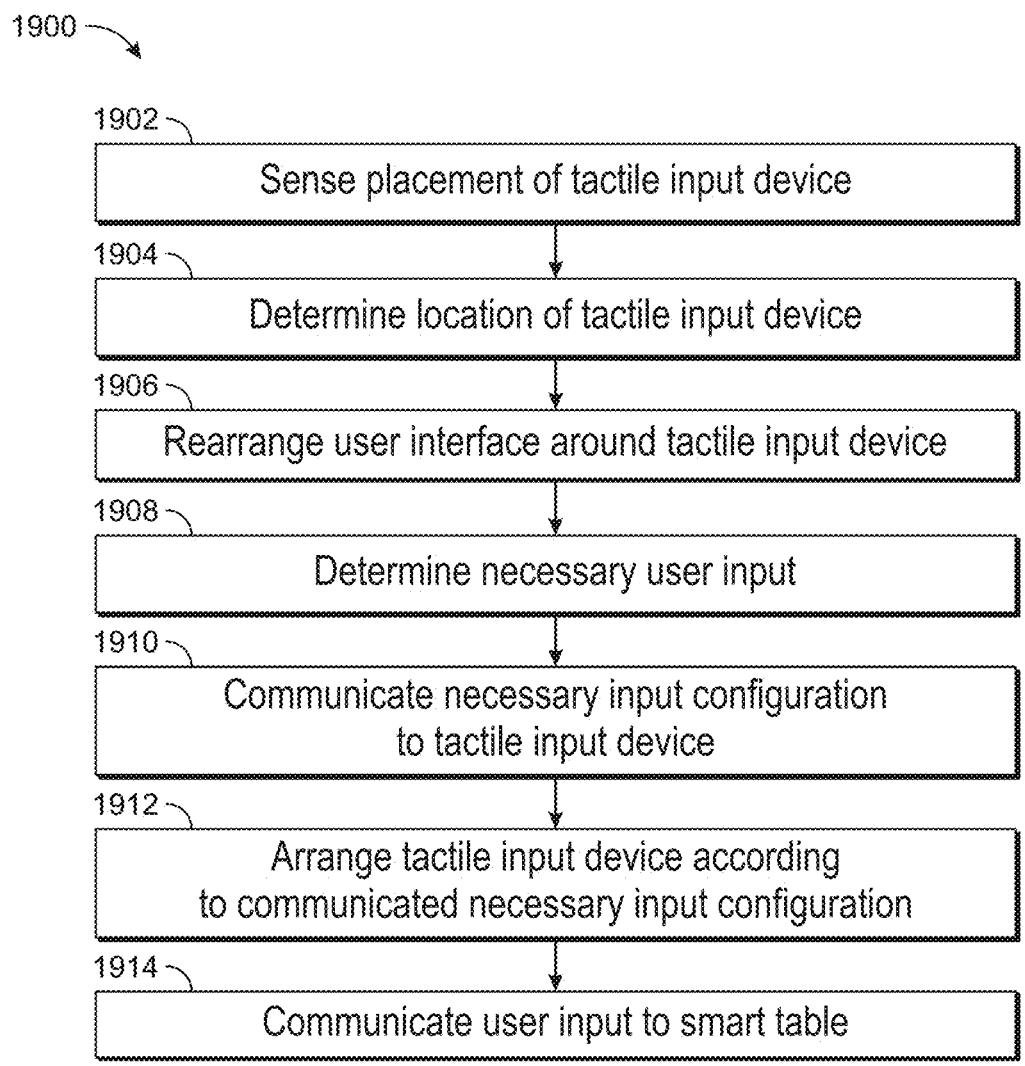
FIG. 19 is a flow diagram of a method for utilizing the tactile input device for user input to the smart table of FIG. 1, according to an example embodiment.

Referring now to FIG. 19, a flow diagram of a method 1900 for utilizing the tactile input device 156 as a user input for the smart table 106 is shown, according to an example embodiment. The method 1900 may be performed by the smart table system 100 described above, with reference to FIGS. 1, 2, and 11. It should be appreciated that the steps of the method 1900 may be performed by either the smart table 106 or the tactile input device 156. For example, the tactile input device 156 may be functional independent of the smart table 106. In some embodiments, method 1900 begins by the tactile input device 156 being placed on the surface of the smart table 106. The smart table 106 may then be configured to sense the placement of the tactile input device 156 on the smart table 106, at step 1902. In other embodiments, the method 1900 may begin in various other manners. For example, in some instances, the tactile input device 156 may be a paired to the smart table 106 (e.g., via a Wi-Fi™ connection or a Bluetooth™ connection), and the method 1900 may alternatively start with an initiation of a banking session by either of the smart table 106 or the tactile input device 156.

Once the tactile input device 156 has been sensed by the smart table 106, the smart table 106 may then determine a necessary user input, at step 1904. The determined necessary user input may be based on a banking session step being performed during a banking session. That is, the necessary user input may depend on which point of a banking session the user is in. For example, in some embodiments, the user may be at a point in a banking session where they are asked to provide any of a variety of inputs to perform a given action associated with the banking session. Accordingly, the necessary user input for the user to provide may include general information (e.g., name, address, account information), a series of numbers (e.g., a deposit/withdrawal amount, a PIN), a biometric sample (e.g., a fingerprint, a facial recognition sample, a retinal scan), a signature (e.g., on a document or other form), or any other necessary input for a given action during the banking session. Further, in some instances, the user may be at a point in a banking session where they are asked to weigh an object (e.g., a safety deposit box) using the tactile input device 156. Accordingly, the necessary user input may also comprise placing the object onto the tactile input device 156 to be weighed.

The smart table 106 may then determine the location of the tactile input device 156 on the smart table 106, at step 1906. For example, in some embodiments, the tactile input device 156 may include pads 1302 arranged on a base of the tactile input device 156 (e.g., as shown in FIG. 13). The pads 1302 may be configured to indicate to a touchscreen of the smart table 106 the location and orientation of the base of the tactile input device 156 (and thus the tactile input device 156) with respect to the smart table 106. Although illustrated as protruding from the base of the tactile input device 156, it should be appreciated that, in some instances, the pads 1302 may be incorporated into the base of the tactile input device 156, such that the pads 1302 sit flush with the surface of the base of the tactile input device 156. In further embodiments, a camera or series of cameras above the smart table 106 may be used to track the position of the tactile input device 156 and communicate said location with the smart table 106. In further embodiments, the smart table 106 may flash an indicator of where to place the tactile input device 156. For example, the banking session may require the tactile input device 156 to be moved between the customer and the branch employee. In this instance, the smart table 106 may indicate a first area in front of the customer on the smart table 106 to place the tactile input device 156 during a first step of a banking session. Then, as the banking session proceeds, the smart table 106 may indicate a second area in front of the branch employee on the smart table 106 to move the tactile input device 156.

In other embodiments, the tactile input device 156 may comprise an array of near-field communication (NFC) sensors that indicate to the smart table 106 the location and orientation of the tactile input device 156. In some embodiments, multiple tactile input devices 156 may be placed on the smart table 106 simultaneously, and the smart table 106 may be configured to pair with and determine the locations and orientations of each of the multiple tactile input devices 156. In some embodiments, the smart table 106 may be configured to continuously determine the location of the tactile input device 156 (or multiple tactile input devices 156). For example, in some instances, the tactile input device 156 may be utilized by multiple people during a banking session. Accordingly, the tactile input device 156 may be used and transferred between multiple people, and the smart table 106 may continuously determine or monitor the location of the tactile input device 156 with respect to the smart table 106.

The smart table 106 may then be configured to rearrange the user interface based on the determined location of the tactile input device 156 and/or the determined necessary user input, at step 1906. For example, the smart table 106 may rearrange the user interface to generate the tactile input device area 1202 (or in some instances tactile input device areas 1202, if multiple tactile input devices 156 are placed on the smart table 106) and the unobstructed area 1204 based on the determined location(s) of the tactile input device(s) 156. By rearranging the user interface, the smart table 106 may be configured to ensure that user information is not obstructed by the tactile input device(s) 156.

As described above, in some embodiments, the tactile input device 156 may be configured to utilize the touch screen of the smart table 106. Accordingly, while rearranging the user interface, at step 1908, the smart table 106 may also generate an appropriate touchscreen layout underneath the tactile input device 156, within the tactile input device area 1202, based on the determined necessary user input. Alternatively, in cases where the tactile input device 156 includes a touchscreen of its own, the tactile input device 156 may be configured to prompt the smart table 106 to not display anything within the tactile input device area 1202.

In some embodiments, instead of rearranging the user interface based on the determined location of the tactile input device 156, the smart table 106 may generate a predefined tactile input device area 1202 and a predefined unobstructed area 1204. In these instances, the predefined tactile input device area 1202 may include a prompt for the user to place the tactile input device 156 within the tactile input device area 1202. This functionality may be used, for example, in instances where the location sensors are optionally omitted or ineffective, or when particular user interfaces are not able to be rearranged due to their content.

In any case, the smart table 106 may then communicate a necessary input configuration to the tactile input device 156. The necessary input configuration may be based on the determined necessary user input. For example, in one embodiment, the user may be at a point in a banking session where they are asked to enter general information such as a name or address. In this instance, the necessary input configuration would be an alphanumeric configuration. In various other instances, the necessary input configuration may be various other types of configurations, such as, for example, a numeric configuration, a signature configuration, a biometric configuration, a scale configuration, or any other necessary input configuration for a given action during a banking session. In some embodiments, the necessary input configuration may be determined based on a field of focus in the banking session. For example, in some instances, the customer may be prompted to enter identifying information (e.g., name, phone number, address) during a step of a banking session. In these instances, the field of focus may initially be a name entry area where the customer may be presented with an alphanumeric layout. During another (e.g., a subsequent) step, the customer may be prompted to enter the customer's phone number. In this instances, the field of focus may be a phone number entry area where the customer may be presented with a numeric input (e.g., 10-key).

Once the tactile input device 156 has received the necessary input configuration from the smart table 106, the tactile input device 156 may be configured to generate a tactile user interface having an appropriate layout based on the necessary input configuration. For example, the tactile input device 156 may be configured to inflate appropriate input areas using the key inflation device 1114 to generate inflatable keys 1304 that are arranged to produce the tactile user interface having the appropriate layout based on the received necessary input configuration. Accordingly, the tactile user interface may be provided in the form of any of the various layouts described above (e.g., the keyboard layout 1400, the numeric keypad layout 1500, the authentication layout 1600, the signature box layout 1700, the scale layout 1800), a layout to allow the user to zoom in or out on the smart table 106, or any other suitable layout, as necessary for a given action during a banking session. In some embodiments, the user may be able to select, on the smart table 106 and/or the tactile input device 156, the desired layout independent of the necessary input. For example, during the banking session, the user may desire a layout that allows the user to zoom in and out on the smart table 106. In this instance, the user may be able to switch the layout of the tactile input device 156 by selecting the desired layout on the smart table 106 and/or the tactile input device 156.

Further, in some instances, the shape formed by the inflatable keys 1304 may be based on user preference and/or may depend on size constraints of the tactile user interface corresponding to the necessary input configuration. For example, in some instances, the keyboard layout 1400 may have crescent shaped inflatable keys 1304. In some instances, the numeric keypad layout 1500 may have round inflatable keys 1304.

Once the tactile user interface has been generated by the tactile input device 156, the user may utilize the tactile input device 156 to provide the necessary user input, which the tactile input device 156 may communicate to the smart table 106, at step 1914. This communication may be done instantaneously, thus allowing the entered information to be displayed on the smart table 106 as it is entered. In other embodiments, the information may be communicated only after a data entry has been finished (e.g., once the entire name or address has been entered) and submitted for transmission. In some embodiments, a data entry window may be populated above the inflatable keys 1304 of the tactile input device to allow the user to track the entry on the tactile input device 156 and/or the smart table 106. In some embodiments, the input may be communicated via at least one of a network connection (e.g., Wi-Fi™), a Bluetooth™ connection, a shared connection, or near-field communication (NFC). In some embodiments, the user input is communicated to the smart table 106 and to the user device 104, and this communication can be done simultaneously or near simultaneous. The user inputs communicated to the user device 104 can be saved on the user device 104 for the user's own records (e.g. so the user can later reference the information that they inputted and provided to the provider).

In further embodiments, the display of the tactile input device 156 may be configured to display UV lights to kill viruses. For example, the tactile input device 156 may receive an indication from the smart table 106 that the banking session has been completed. In this instance, the display of the tactile input device 156 may display UV lights for a determined period of time (e.g., 30 seconds, 5 minutes, 20 minutes). In some embodiments, the tactile input device 156 may be configured to display UV lights between inputs required by the branch employee and the customer.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuitry" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Example systems and devices in various embodiments might include a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A tactile user input system comprising:
   a tactile input device; and
   a smart table comprising a display screen, a network interface and a processing circuit, the network interface structured to facilitate data communication with the tactile input device via a network, the processing circuit comprising a processor and a memory, the processing circuit structured to:
   determine a placement of the tactile input device on the smart table;
   determine a necessary user input;
   determine a location of the tactile input device on the smart table;
   rearrange a user interface of the smart table based on at least one of the necessary user input or the location of the tactile input device on the smart table; and
   communicate a necessary input configuration to the tactile input device to be used by the tactile input device to generate a tactile user interface on the tactile input device having a layout configured to receive the necessary user input;
   wherein the tactile input device is configured to be used to remotely provide authorization for a transaction made using the smart table.

2. The system of claim 1, wherein the layout comprises at least one of:
   an alphanumeric keyboard layout configured to allow a user to provide alphanumeric information;
   a numeric keyboard layout configured to allow the user to provide numeric information;
   an authentication layout configured to allow the user to provide a biometric sample;
   a signature layout configured to allow the user to provide a signature; or
   a scale layout configured to allow the user to weigh an object.

3. The system of claim 1, wherein the processing circuit is configured to determine the placement of the tactile input device on the smart table using at least one of a Bluetooth device or a near-field communication (NFC) device.

4. The system of claim 1, wherein the display screen comprises a touchscreen, wherein the processing circuit is configured to determine the location of the tactile input device based on the touchscreen of the smart table recognizing a base of the tactile input device.

5. The system of claim 1, wherein the tactile input device is configured to be paired with the smart table via at least one of a network connection, a Bluetooth connection, a shared connection, or a near-field communication (NFC) connection.

6. The system of claim 1, wherein the tactile input device is configured to receive user input, wherein the user input comprises at least one of an alphanumeric input, a numeric input, a signature input, a biometric input, or a weight input.

7. The system of claim 1, wherein the determined necessary user input is determined based on a user selection made during a banking session.

8. The system of claim 1, wherein the tactile input device is functionally independent of the smart table.

9. A tactile input device comprising:
   a touch screen;
   a tactile overlay including a plurality of selectable keys and configured to selectively generate a plurality of tactile user interfaces, each of the plurality of tactile user interfaces having a unique layout;
   a processing circuit configured to:
   receive a necessary input configuration from a smart table, wherein the smart table comprises a display screen;
   generate a tactile user interface on the touch screen having a layout based on the necessary input configuration;
   receive, via the tactile user interface, a user input; and
   communicate the user input to the smart table, wherein the user input comprises an authorization for a transaction made using the smart table, wherein the user input is communicated to the smart table when the tactile input device is remote from the smart table.

10. The tactile input device of claim 9, further comprising:
    a weight sensor configured to weigh an object placed on the tactile input device.

11. The tactile input device of claim 9, wherein the layout comprises at least one of:
    an alphanumeric keyboard layout configured to allow a user to provide alphanumeric information;
    a numeric keyboard layout configured to allow the user to provide numeric information;

an authentication layout configured to allow the user to provide a biometric sample;

a signature layout configured to allow the user to provide a signature; or a scale layout configured to allow the user to weigh an object.

12. The tactile input device of claim 11, wherein the tactile user interface comprises the authentication layout, wherein the authentication layout comprises:

a 10-key PIN layout; and a biometric scanner.

13. The tactile input device of claim 9, wherein the processing circuit is configured to communicate the necessary input configuration to the smart table via at least one of a network connection, a Bluetooth connection, a shared connection, or near-field communication (NFC).

14. The tactile input device of claim 9, wherein the touch screen is configured to display UV lights after a user session, the UV lights configured to sanitize the touch screen.

15. A tactile input device comprising:

a tactile overlay including a plurality of selectively inflatable keys and configured to selectively generate a plurality of tactile user interfaces, each of the plurality of tactile user interfaces having a unique layout; and a processing circuit configured to:

receive a necessary input configuration from a smart table, wherein the smart table comprises a display screen;

generate a tactile user interface having a layout based on the necessary input configuration by selectively inflating at least one of the plurality of selectively inflatable keys; and receive a user input via the tactile user interface, wherein the user input comprises an authorization for a transaction made using the smart table, wherein the user input is communicated to the smart table when the tactile input device is remote from the smart table.

16. The tactile input device of claim 15, further comprising:

a weight sensor configured to weigh an object placed on the tactile input device.

17. The tactile input device of claim 15, wherein the layout comprises at least one of:

an alphanumeric keyboard layout configured to allow a user to provide alphanumeric information;

a numeric keyboard layout configured to allow the user to provide numeric information;

an authentication layout configured to allow the user to provide a biometric sample;

a signature layout configured to allow the user to provide a signature; or a scale layout configured to allow the user to weigh an object.

18. The tactile input device of claim 17, wherein the authentication layout comprises:

a 10-key PIN layout; and a biometric scanner.

19. The tactile input device of claim 15, wherein the tactile input device is configured to be paired with the smart table via at least one of a network connection, a Bluetooth connection, a shared connection, or near-field communication (NFC).

* * * * *